(12) United States Patent
Hopen et al.

(10) Patent No.: US 8,615,796 B2
(45) Date of Patent: *Dec. 24, 2013

(54) MANAGING RESOURCE ALLOCATIONS

(75) Inventors: Chris Hopen, Shoreline, WA (US); Bryan Sauve, Fall City, WA (US); Paul Hoover, Seattle, WA (US); Bill Perry, Bloomington, IN (US)

(73) Assignee: Aventail LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,884

(22) Filed: Jul. 30, 2009

(65) Prior Publication Data

US 2010/0024008 A1 Jan. 28, 2010

Related U.S. Application Data

(60) Division of application No. 11/251,592, filed on Oct. 14, 2005, which is a continuation-in-part of application No. 11/009,692, filed on Dec. 10, 2004, now Pat. No. 8,255,973.

(60) Provisional application No. 60/528,870, filed on Dec. 10, 2003, provisional application No. 60/619,151, filed on Oct. 14, 2004.

(51) Int. Cl.
*G06F 9/00* (2006.01)

(52) U.S. Cl.
USPC ........ 726/13; 726/43; 726/4; 726/15; 726/16; 709/219; 709/226; 709/245; 709/225; 709/238

(58) Field of Classification Search
USPC .......... 709/226, 219, 245, 225, 238; 726/3, 4, 726/13, 15, 16
See application file for complete search history.

(56) References Cited

U.S. PATENT DOCUMENTS

| | | | |
|---|---|---|---|
| 6,052,780 A | 4/2000 | Glover | |
| 6,081,601 A | 6/2000 | Raivisto | |

(Continued)

FOREIGN PATENT DOCUMENTS

| | | |
|---|---|---|
| EP | 0804012 | 10/1997 |
| EP | 1308822 | 5/2003 |

(Continued)

OTHER PUBLICATIONS

Raghunath, Satish et al. "Measurement Based Characterization and Provisioning of IP VPNs." Proceedings of the 4th ACM SIGCOMM conference on Internet measurement. ACM Press. Oct. 2004. 342-55.

(Continued)

*Primary Examiner* — Beemnet Dada
*Assistant Examiner* — Sayed Beheshti Shirazi
(74) *Attorney, Agent, or Firm* — Lewis Roca Rothgerber LLP

(57) ABSTRACT

Techniques for determining which resource access requests are handled locally at a remote computer, and which resource access requests are routed or "redirected" through a virtual private network. One or more routing or "redirection" rules are downloaded from a redirection rule server to a remote computer. When the node of the virtual private network running on the remote computer receives a resource access request, it compares the identified resource with the rules. Based upon how the identified resource matches one or more rules, the node will determine whether the resource access request is redirected through the virtual private network or handled locally (e.g., retrieved locally from another network). A single set of redirection rules can be distributed to and employed by a variety of different virtual private network communication techniques.

3 Claims, 17 Drawing Sheets

(56) References Cited

U.S. PATENT DOCUMENTS

| | | |
|---|---|---|
| 6,081,900 A | 6/2000 | Subramaniam et al. |
| 6,128,279 A | 10/2000 | O'Neil et al. |
| 6,138,153 A | 10/2000 | Collins, III et al. |
| 6,199,099 B1 | 3/2001 | Gershman et al. |
| 6,244,758 B1 | 6/2001 | Solymar et al. |
| 6,269,392 B1 | 7/2001 | Cotichini et al. |
| 6,300,863 B1 | 10/2001 | Cotichini et al. |
| 6,321,334 B1 | 11/2001 | Jerger et al. |
| 6,594,704 B1 | 7/2003 | Birenback et al. |
| 6,631,416 B2 | 10/2003 | Bendinelli |
| 6,675,206 B1 | 1/2004 | Britton |
| 6,691,232 B1 | 2/2004 | Wood et al. |
| 6,701,437 B1 | 3/2004 | Hoke et al. |
| 6,760,330 B2 | 7/2004 | Tahan |
| 6,772,350 B1 | 8/2004 | Belani et al. |
| 6,779,030 B1* | 8/2004 | Dugan et al. ............ 709/223 |
| 6,850,943 B2 | 2/2005 | Teixeira et al. |
| 6,873,988 B2 | 3/2005 | Herrmann et al. |
| 6,874,028 B1 | 3/2005 | Feinleib et al. |
| 6,880,005 B1 | 4/2005 | Bell et al. |
| 6,920,502 B2 | 7/2005 | Araujo et al. |
| 6,957,274 B2 | 10/2005 | Trace |
| 6,996,631 B1 | 2/2006 | Aiken, Jr. |
| 7,000,121 B2 | 2/2006 | Jarosz |
| 7,017,162 B2 | 3/2006 | Smith et al. |
| 7,073,093 B2 | 7/2006 | Mannarsamy |
| 7,092,987 B2 | 8/2006 | Brittingham et al. |
| 7,093,024 B2 | 8/2006 | Craddock |
| 7,099,955 B1 | 8/2006 | Gregg |
| 7,107,614 B1 | 9/2006 | Boden et al. |
| 7,127,493 B1 | 10/2006 | Gautier |
| 7,131,141 B1 | 10/2006 | Blewett |
| 7,222,172 B2 | 5/2007 | Arakawa |
| 7,272,625 B1 | 9/2007 | Hannel et al. |
| 7,283,544 B2 | 10/2007 | Johnson et al. |
| 7,373,660 B1 | 5/2008 | Guichard et al. |
| 7,401,354 B2 | 7/2008 | Boden et al. |
| 7,447,782 B2 | 11/2008 | Tahan |
| 7,461,147 B1 | 12/2008 | Mowat et al. |
| 7,493,380 B2 | 2/2009 | Aman et al. |
| 7,574,738 B2 | 8/2009 | Daude et al. |
| 7,580,919 B1 | 8/2009 | Hannel |
| 7,624,142 B2 | 11/2009 | Jungck |
| 7,644,151 B2 | 1/2010 | Jerrim et al. |
| 7,698,388 B2* | 4/2010 | Hoover et al. ............ 709/219 |
| 7,760,701 B2 | 7/2010 | Levy-Abegnoli et al. |
| 7,770,222 B2 | 8/2010 | Hopen et al. |
| 7,779,469 B2 | 8/2010 | Hopen et al. |
| 7,822,829 B2 | 10/2010 | Philyaw et al. |
| 7,822,839 B1 | 10/2010 | Pruitt et al. |
| 7,827,590 B2 | 11/2010 | Hopen et al. |
| 7,865,603 B2 | 1/2011 | Braddy et al. |
| 7,870,294 B2 | 1/2011 | Braddy et al. |
| 8,005,983 B2* | 8/2011 | Hopen et al. ............ 709/238 |
| 8,090,827 B2* | 1/2012 | Hoover et al. ............ 709/225 |
| 8,255,973 B2 | 8/2012 | Hopen et al. |
| 8,301,769 B2 | 10/2012 | Hopen et al. |
| 2002/0026576 A1 | 2/2002 | Das-Purkayastha et al. |
| 2002/0053031 A1 | 5/2002 | Bendinelli et al. |
| 2002/0078215 A1 | 6/2002 | Tahan |
| 2002/0099937 A1 | 7/2002 | Tuomenoksa |
| 2002/0103903 A1 | 8/2002 | Bruton et al. |
| 2002/0112052 A1 | 8/2002 | Brittingham et al. |
| 2002/0167965 A1 | 11/2002 | Beasley et al. |
| 2002/0198984 A1 | 12/2002 | Goldstein et al. |
| 2003/0074472 A1 | 4/2003 | Lucco et al. |
| 2003/0191944 A1 | 10/2003 | Rothrock |
| 2003/0196091 A1 | 10/2003 | Raley et al. |
| 2003/0196121 A1 | 10/2003 | Raley et al. |
| 2003/0210791 A1 | 11/2003 | Binder |
| 2003/0229613 A1 | 12/2003 | Zargham et al. |
| 2003/0233401 A1 | 12/2003 | Dean |
| 2004/0003084 A1 | 1/2004 | Malik |
| 2004/0015961 A1 | 1/2004 | Chefalas et al. |
| 2004/0042605 A1 | 3/2004 | Evslin |
| 2004/0078471 A1 | 4/2004 | Yang |
| 2004/0148439 A1 | 7/2004 | Harvey et al. |
| 2004/0153533 A1 | 8/2004 | Lewis |
| 2004/0165592 A1 | 8/2004 | Chen et al. |
| 2004/0223491 A1 | 11/2004 | Levy-Abegnoli et al. |
| 2004/0249919 A1 | 12/2004 | Mattheis |
| 2005/0044544 A1 | 2/2005 | Slivka et al. |
| 2005/0083955 A1 | 4/2005 | Guichard et al. |
| 2005/0120095 A1 | 6/2005 | Aman et al. |
| 2005/0144481 A1 | 6/2005 | Hopen et al. |
| 2005/0273779 A1 | 12/2005 | Cheng et al. |
| 2006/0143703 A1* | 6/2006 | Hopen et al. ............ 726/15 |
| 2006/0161970 A1 | 7/2006 | Hopen et al. |
| 2006/0162726 A1 | 7/2006 | Smith et al. |
| 2006/0271544 A1 | 11/2006 | Devarakonda et al. |
| 2007/0061887 A1* | 3/2007 | Hoover et al. ............ 726/26 |
| 2008/0134302 A1 | 6/2008 | Hopen et al. |
| 2008/0148364 A1 | 6/2008 | Hopen et al. |
| 2008/0162698 A1* | 7/2008 | Hopen et al. ............ 709/226 |
| 2010/0036955 A1* | 2/2010 | Hopen et al. ............ 709/226 |
| 2010/0121943 A1* | 5/2010 | Hoover et al. ............ 709/219 |
| 2010/0333169 A1 | 12/2010 | Hopen et al. |
| 2011/0167101 A1 | 7/2011 | Hopen et al. |
| 2011/0167475 A1* | 7/2011 | Hoover et al. ............ 726/3 |

FOREIGN PATENT DOCUMENTS

| | | |
|---|---|---|
| JP | 2004-064182 | 2/2004 |
| JP | 2006-013732 | 1/2006 |
| WO | WO 99/057866 | 11/1999 |
| WO | WO 02/37799 | 5/2002 |
| WO | WO 02/099571 | 12/2002 |

OTHER PUBLICATIONS

Napier, Duncan. "Setting up a VPN Gateway." Linux Journal. vol. 2002, Issue 93. Specialized Systems Consultants, Inc. Jan. 2002. 11 pages.

"Microsoft® Computer Dictionary," Fifth Edition, Microsoft Press, May 1, 2002, 2 pages.

Canter, Sheryl "Kill Internet Ads with HOSTS and PAC Files," Online! Mar. 30, 2004, retrieved from the internet URL:http://web.archive.org/web20040426140542/http://www.windowsdevcenter.com/pub/a/windows/2004/03/30/hosts.html, retrieved Jan. 24, 2006.

Cisco et al., "Release Notes for Cisco Cache Engine, Version 2.0.3," Dec. 1999, pp. 1-11.

Kritzner, Ulrich "Objektrferenz-Das Navigator-Objekt," Javascript-Tutorial, Online!, Mar. 31, 2002, XP 002331683 retrieved from http://web/archive.org/web/2002033104028/http://js-tut.aardon.de/js-tut/anhangA/navigator.html.

NN9603183. "Security for Routing Based on Link State Algorithms." IBM Technical Disclosure Bulletin. Mar. 1996. US. vol. 39, Issue 3, pp. 183-190.

Papadimitratos, Panagiotis et al. "Securing the Internet Routing Infrastructure." IEEE Communications Magazine. Oct. 2002. IEEE Press. 60-68.

U.S. Appl. No. 12/821,060 Final Office Action mailed Mar. 12, 2012.
U.S. Appl. No. 11/009,692 Final Office Action mailed Dec. 2, 2008.
U.S. Appl. No. 11/009,692 Office Action mailed Aug. 29, 2008.
U.S. Appl. No. 11/251,087 Office Action mailed Aug. 20, 2009.
U.S. Appl. No. 11/251,592 Office Action mailed Apr. 13, 2011.
U.S. Appl. No. 11/251,592 Final Office Action mailed Nov. 3, 2009.
U.S. Appl. No. 11/251,592 Office Action mailed Apr. 29, 2009.
U.S. Appl. No. 11/371,348 Final Office Action mailed Feb. 22, 2013.
U.S. Appl. No. 11/371,348 Office Action mailed Sep. 21, 2012.
U.S. Appl. No. 11/371,348 Office Action mailed Sep. 25, 2009.
U.S. Appl. No. 11/972,272 Office Action mailed Sep. 29, 2009.
U.S. Appl. No. 11/927,286 Office Action mailed Nov. 17, 2009.
U.S. Appl. No. 12/938,330 Final Office Action mailed Feb. 1, 2013.
U.S. Appl. No. 13/038,340 Office Action mailed Dec. 5, 2012.
International Search Report and Written Opinion for PCT/US2005/037292 mailed Apr. 7, 2006.
U.S. Appl. No. 11/251,592 Advisory Action mailed Feb. 22, 2012.
U.S. Appl. No. 13/038,340 Office Action mailed Sep. 6, 2013.
U.S. Appl. No. 13/038,340 Final Office Action mailed Jul. 25, 2013.

* cited by examiner

| Add/Edit Resource | Resources > Add/Edit Resource |

Create or modify a resource.

Name:*      Description:

Resource definition

⦿ Host name or IP
409 →

○ IP range
411 → From:     To:

○ Subnet
413 → IP:     Subnet mask:

○ Domain
415 →    ☐ Windows domain   Enter a NetBIOS or DNS name for a Windows domain (*example*, or *example.com*).

○ URL
417 →    If an HTTPS resource, include the https:// protocol.

○ Network share
   Enter using UNC syntax.
419

☐ Create shortcut on ASAP WorkPlace
421          407

FIG. 4B

MANAGING RESOURCE ALLOCATIONS

CROSS-REFERENCE TO RELATED APPLICATIONS

The present application is a divisional and claims the priority benefit of U.S. patent application Ser. No. 11/251,592 filed Oct. 14, 2005 and entitled "Rule-Based Routing to Resources Through a Network," which is a continuation-in-part and claims the priority benefit of U.S. patent application Ser. No. 11/009,692 filed Dec. 10, 2004 now U.S. Pat. No. 8,255,973 which in turn claims the priority benefit of U.S. Provisional Patent Application number 60/528,870 filed Dec. 10, 2003. U.S. patent application Ser. No. 11/251,592 also claims the priority benefit of U.S. Provisional Patent Application No. 60/619,151 filed Oct. 14, 2004 . The disclosures of the aforementioned applications are incorporated entirely herein by reference.

FIELD OF THE INVENTION

The present invention relates to the routing of messages from a client computer to one or more resources through a network. Various aspect of the invention may be used to ensure that messages sent from a client computer through a virtual private network (VPN) channel to a network are correctly routed to the appropriate resources.

BACKGROUND OF THE INVENTION

In the last decade, the use of electronic computer networks has greatly increased. Electronic computer networks may be found in businesses, schools, hospitals, and even residences. With these networks, two or more computing devices communicate together to exchange packets of data according to one or more standard protocols, such as the TCP/IP protocols. Usually, one computer, often referred to as a "client," requests that a second computer perform a service. In response, the second computer, often referred to as a "server," performs the service and communicates the resulting data back to the first computer.

As reliance on computers has increased, the demand to access computer resources from a variety of locations has increased as well. Conventionally, for example, a business user may have accessed resources on a corporate server through a desktop computer connected to the corporate server by a private, secure corporate network. Now, however, that user may wish to access the same corporate resources from a remote location over a public network, such as the Internet. For example, a user may need to access resources through a corporate network from a personal computer while at home or from a laptop computer while traveling. In order to securely access the resources, the user will typically employ an encrypted communication technique. The network formed by the remote computer and the network using encrypted communications are typically referred to as a Virtual Private Network (VPN).

A virtual private network can be formed using a plurality of different encrypted communication techniques. For example, a remote computer may implement a temporary or permanent dedicated communication software application to securely communicate with the network. The dedicated communication software application will then encrypt and send and messages to the network, and receive and decrypt messages received from the network. Some examples of this type of dedicated communication software application may embed encrypted messages in conventionally formatted data packets, so that the encrypted messages are invisible from outside of the secure communication channel. The virtual private networks that employ these embedded communication techniques are sometimes referred to as "tunneling" virtual private networks, as their communications may "tunnel" through a public network. Alternately, a remote computer may communicate with a network using a conventional browser application enhanced with additional "plug-in" software. With this type of virtual private network, the resources may be used by the network rather than the remote computer. The information obtained from using the resources will then be visible through the browser.

It also should be appreciated that, with some implementations of a virtual private network, the remote computer can communicate point-to-point with some or all of the nodes within the network. With still other implementations of a virtual private network, however, the remote computer may directly communicate with only a proxy software application. The proxy software application will then decrypt communications from the remote computer, and route them to the appropriate node within the network. With this type of virtual private network, the proxy software application will be hosted on a computer (or computing node) outside of a firewall protecting the network. The proxy software application will then communicate with network nodes through the firewall. Different types of virtual private networks may employ any desired encryption technique. For example, a virtual private network may implement communication channels secured using the Secure Socket Layers (SSL) protocol, the Hypertext Transfer Protocol Secure (HTTPS) protocol (which employs the Secure Socket Layers (SSL) protocol), or the Internet Protocol Security (IPSec) protocol.

While a virtual private network can provide a remote computer with secure access to resources through a network, it may be desirable for the virtual private network to ignore some resource access requests. For example, a user or software application running on the remote computer may request access to a resource that is simply unavailable to the network. Alternately, a user or software application running on the remote computer may request access to a resource that is available through the public network. For example, a company may maintain a network with the hostname "mycompany.com." While this network may include several private resources, it also may include various portions that are publicly accessible, such as World Wide Web pages available through the domain name "mycompany.com."Accordingly, it may be a waste of valuable bandwidth on a secure communication channel to access resources that can otherwise be obtained through the public network. If a resource cannot or should not be accessed through the virtual private network, then it may be preferable for the virtual private network to ignore a request to access the resource, and instead have the resource access request handled locally at the remote computer via a different network mechanism.

Also, virtual private networks will conventionally access resources through a network using specific addresses for the resource locations, such as Internet Protocol (IP) addresses. This access regimen allows the resource to be more easily identified. It would be desirable, however, to allow resources to be accessed using name identifiers, such as hostnames and domain names. A name may be consistently employed to access a resource, for example, even if the specific IP address changes.

BRIEF SUMMARY OF THE INVENTION

Various aspects of the invention relate to techniques for determining which resource access requests are handled locally at a remote computer, and which resource access requests are routed or "redirected" through the virtual private network. With some examples of the invention, for example, one or more routing or "redirection" rules are downloaded from a redirection rule server to the remote computer. When the node of the virtual private network running on the remote computer receives a resource access request, it compares the identified resource with the rules. Based upon how the identified resource matches one or more rules, the node will determine whether the resource access request is redirected through the virtual private network or handled locally (e.g., retrieved locally from another network). With various examples of the invention, a single set of redirection rules can be distributed to and employed by a variety of different virtual private network communication techniques. With still other embodiments of the invention, the network may compile a user-specific list of redirection rules according to a user's authority to access resources through the network. Thus, the redirection rules downloaded to the virtual private network node operating on a remote computer will reference only those resources that the user of the node has permission to access.

Further, various implementations of the invention will employ redirection rules that identify resources using names instead of, or in addition to, specific IP addresses. Thus, the redirection rules can be employed by applications running on a remote computer by resource names rather than specific addresses for resource locations. By comparing a resource name in resource access request with resource names in a list of redirection access rules, a virtual private network node operating on a remote computer can determine whether a resource access request is redirected through the virtual private network based only upon the name of the resource.

BRIEF DESCRIPTION OF THE DRAWINGS

FIGS. 4A and 4B illustrate user interfaces that may be employed with various implementations of the invention to define a resource employed according to various examples of the invention.

DETAILED DESCRIPTION OF THE INVENTION

Client/Server Configuration

Various embodiments of the invention will typically be employed to facilitate cooperation between a client and one or more servers in a network. As known in the art, a client/server configuration (including a Web based architecture configuration) occurs when a computing device requests the use of or access to a resource from another computing device. For convenience and ease of understanding hereafter, requests to use, obtain, or otherwise access a resource may generically be referred to simply as "requesting" a resource, while using, obtaining, or otherwise accessing a resource may generically be referred to simply as "obtaining" or "accessing" a resource.

Because the computing device responsible for providing the resource "serves" the computing device initially requesting the resource, the computing device responsible for providing the resource is often referred to as a "server." The computing device requesting the resource is then commonly referred to as a "client." Also, because a request for resources and the delivery of those resources may be relayed among a variety of computing devices having a client/server relationship, the client computing device initially requesting the resource is commonly referred to as the "end point" client.

Figure 1:
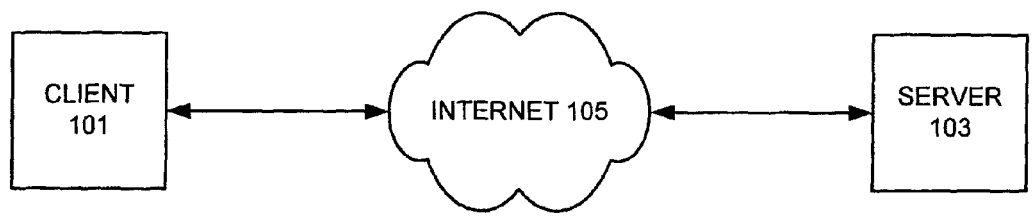
FIG. 1 shows one example of a conventional client/server network.

FIG. 1 illustrates a conventional relationship between a client 101 and a server 103.

As seen in this figure, the client 101 may transmit the request for one or more resources to the server 103 over a network 105. The network 105 may be a private network, such as an intranet, or a public network, such as the Internet. The server 103 may then provide the client 101 with the requested resources over the network 105.

It should be noted that, as used herein, a server may be considered a virtual device rather than a physical device. For example, the functions of the server 103 may be performed by a single computing device. Alternately, the functions of the server 103 may be performed by a group of computing devices cooperating together. Similarly, a client may be considered a virtual device. That is, one or more separate computing devices can cooperate together to function as a client. In many situations, a client may work with multiple servers in order to obtain a resource. For example, a client may submit the request for a resource to a first server, which may then relay the request to a second server. The second server may authenticate the identity of the client (or a user employing the client), to determine whether the client should be permitted may access or use the requested resource. Yet another server may then actually provide the resource to the client.

As used herein, a resource may be any type of object or service available through a server. For example, the resource may be a data file or a directory of data files. The resource may also be a service, such as an electronic mailing service, a database service, a document management service, a remote shell or terminal service, or the like. Further, a resource may be within a network, or it may be located outside of the network but accessible to the client through the network.

Example Computing Device

Various embodiments of a virtual private network according to the invention may be implemented using dedicated analog or digital electronic circuitry. More typically, however, the various features of the invention will be implemented by executing software instructions on a programmable computing device or computer. For example, each node in a virtual private network will typically be implemented by executing software instructions on a programmable computing device or computer. Accordingly, FIG. 2 shows one example of a computer 201 that can be used to implement various aspects of the invention.

Figure 2:
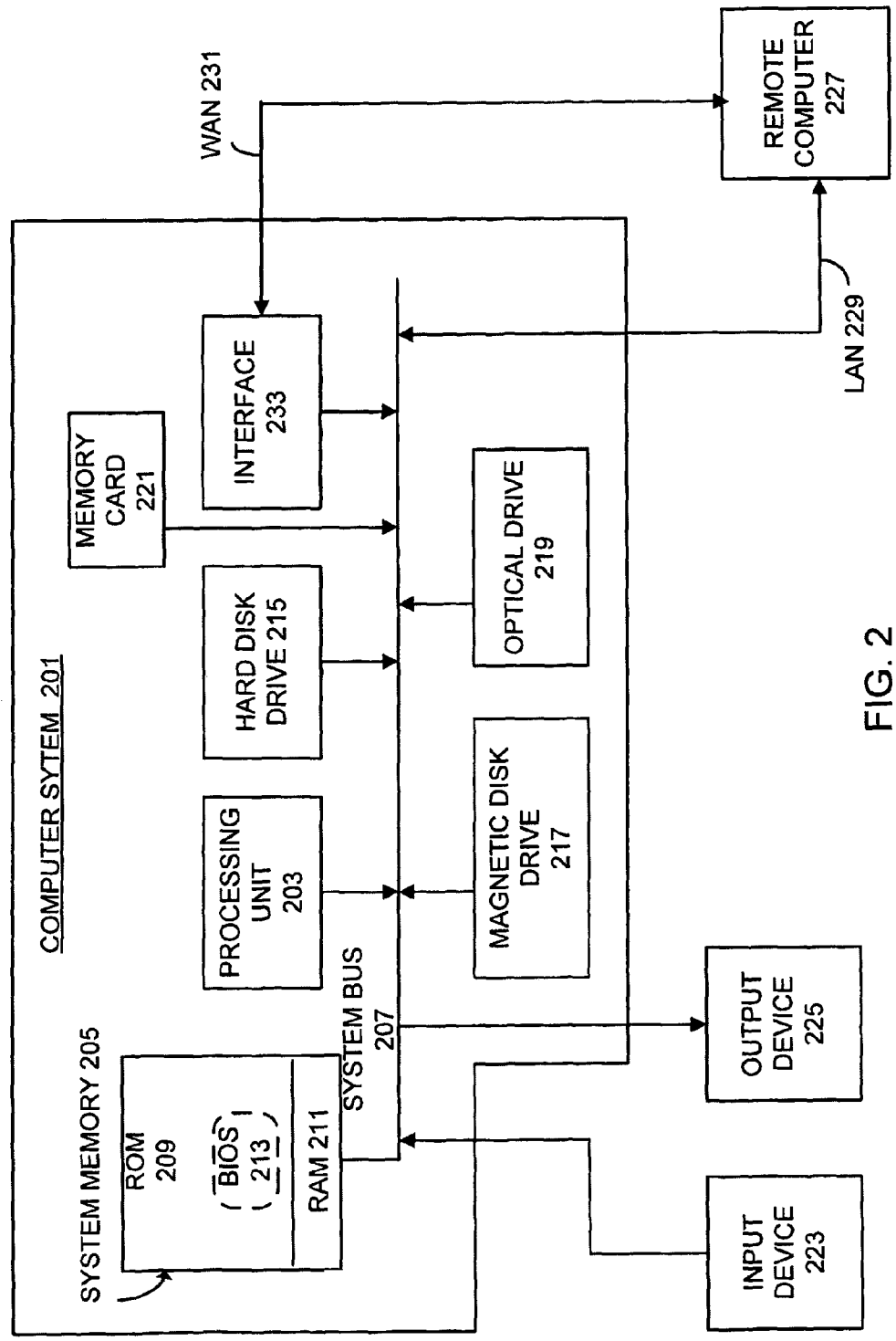
FIG. 2 shows an example of a computing device that can be used to implement a network appliance according to various examples of the invention.

The computer system 201 illustrated in FIG. 2 includes a processing unit 203, a system memory 205, and a system bus 207 that couples various system components, including the system memory 205, to the processing unit 203. The system memory 205 may include a read-only memory (ROM) 209 and a random access memory (RAM) 211. A basic input/output system 213 (BIOS), containing the routines that help to transfer information between elements within the computer system 201, such as during startup, may be stored in the read-only memory (ROM) 209. If the computer system 201 is embodied by a special-purpose "server application" computer system 201, it may further include, for example, another processing unit 203, a hard disk drive 215 for reading from and writing to a hard disk (not shown), a magnetic disk drive 217 for reading from or writing to a removable magnetic disk (not shown), or an optical disk drive 219 for reading from or writing to a removable optical disk (not shown) such as a CD-ROM or other optical media.

A number of program modules may be stored on the ROM 209, the hard disk drive 215, the magnetic disk drive 217, and the optical disk drive 219. A user may enter commands and information into the computer system 201 through an input device 223, such as a keyboard, a pointing device, a touch screen, a microphone, a joystick or any other suitable interface device. Of course, the computer system 201 may simultaneously employ a variety of different input devices 223, as is known in the art. An output device 225, such as a monitor or other type of display device, is also included to convey information from the computer system 201 to the user. As will be appreciated by those of ordinary skill in the art, a variety of output devices 225, such as displays, speakers and printers, may alternately or additionally be included in the computer system 201.

In order to access other computing devices, the computer system 201 should be capable of operating in a networked environment using logical connections to one or more remote computing devices, such as the remote computing device 227. The computer system 201 may be connectable to the remote computer 227 through a local area network (LAN) 229 or a wide area network (WAN) 231, such as the Internet. When used in a networking environment, the computer system 201 may be connected to the network through an interface 233, such as a wireless or wired network interface card (NIC) or similar device. While the interface 233 is illustrated as an internal interface in FIG. 2, it may alternately be an external interface as is well known in the art. Of course, it will be appreciated that the network connections shown in this figure are for example only, and other means of establishing a communications link with other computers may be used.

A Virtual Private Network System

Figure 3:
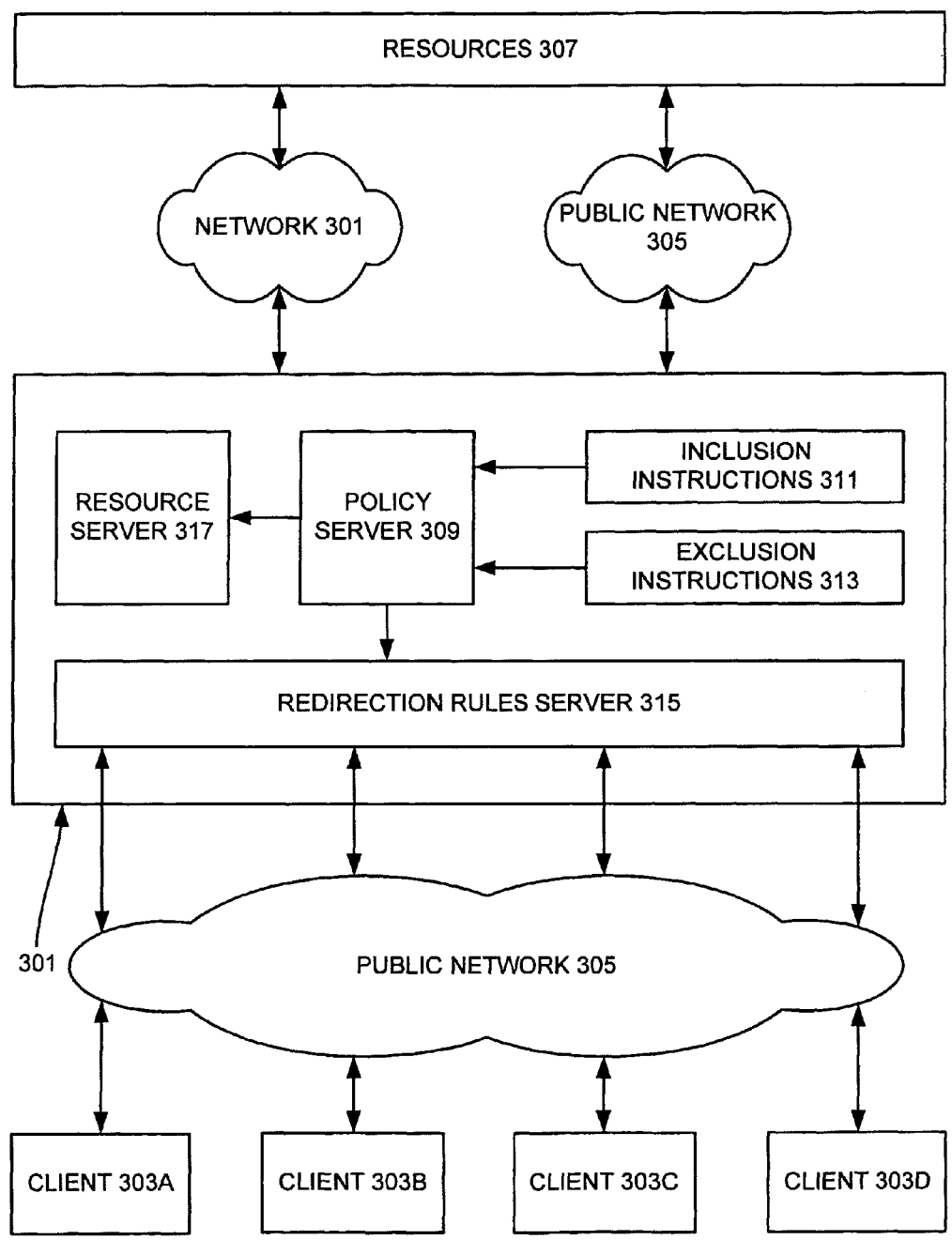
FIG. 3 shows an example of a virtual private network system that may be employed according to various examples of the invention.

FIG. 3 illustrates one example of a virtual private network that may be used to implement various embodiments of the invention. As seen in this figure, the virtual private network includes a local area network (LAN) 301, and one or more remotely located clients 303. Each client 303 communicates with the network 301 through an intermediate network 305. In the illustrated example, the intermediate network 305 is a public network, such as the Internet. With alternate examples of the invention, however, the network 305 may be a private network, such a corporate or institutional intranet. A client 303 may be implemented by any suitable computing device or combination of computing devices. For example, a client 303 may be a programmable computer, such as the programmable computer 201 described above. The computer may be, for example, a personal desktop computer, a laptop computer, or even a personal digital assistant or "smart" telephone.

As employed herein, the term "user" will refer to the individual using a client 303 to obtain one or more resources 307 through the server system 301. For some applications of the invention, a client 303 may be implemented on a computing device owned by its user or by the same corporation or institution maintaining the local area network 301 (or by a related corporation or institution). With still other applications of the invention, a client 303 may be implemented on a computing device owned by a third party, and may even be provided in a publicly available kiosk. A client 303 may obtain access to one or more resources 307 through the local area network 301. In some situations, the resources 307 may be included within the local area network 301. Alternately, one or more of the resources 307 may be available to the local area network 301 over a public network 305. In either case, a client 303 accesses the resources 307 through the local area network 301.

The local area network 301 includes a number of components used to control the clients' 303 access to the resources 307. For example, the network 301 may include a policy server 309. The policy server 309 contains a list of each of the resources 307, along with their location. For example, a resource 307 may be identified by an Internet protocol (IP) address, a domain name, a host name, a universal resource locator (URL) address, or the like. The policy server 309 then includes a set of rules determining the conditions under which each client 303 may or may not access each resource 307. The policy server 309 determines the conditions under which a user of the client 303 may obtain a requested resource 307. More particularly, the policy server 309 administers policy rules specifying the conditions under which a user may obtain a requested resource. With various embodiments of the invention, these conditions may include both the identity of the user and the operating environment of the client 303. With various embodiments of the invention, the policy server 309 also may validate authentication credentials submitted by a user with a request to obtain resources 307 through the network 301. As used herein, the term "administrator" will refer to a person authorized to configure policy rules for enforcement by the policy server 309.

As will be discussed in further detail below, various implementations of the invention allow a network administrator or other authorized person to provide inclusion instructions 311 for the resource information in the policy server 309, in order to create a set of inclusion redirection rules. Some embodiments of the invention may also allow a network administrator or other authorized person to provide exclusion instructions 313 for the resource information in the policy server 309, in order to create a set of exclusion redirection rules. These redirection rules may then be stored in the redirection rule server 317. Accordingly, when a client 303 connects to the local area network 301, the client 303 can obtain the redirection rules from the redirection rule server 315, and subsequently employ those rules to determine which resource access requests are redirected to the network 301, and which resource access requests are handled locally by the client 303.

The network 301 also may include one or more resource servers 317, which facilitates a client's access to one or more resources 307. Typically, a client 303 transmits some type of resource access request to the network 301 requesting that the use of or access to one or more resources 307 be provided through the resource server 317. With various embodiments of the invention, the client 303 may request one or more resources from the resource server 317 through a secure communication channel. For example, a client 303 may seek to establish a secure communication channel using any desired conventional security protocol, such as the Secure Socket Layers (SSL) protocol, the Hypertext Transfer Protocol Secure (HTTPS) protocol, (which employs the Secure Socket Layers (SSL) protocol), the Internet Protocol Secure protocol (IPSec), the SOCKet Secure (SOCKS) protocol, the Layer Two Tunneling Protocol (L2TP), the Secure Shell (SSH) protocol, or the Point-to-Point Tunneling Protocol (PPTP). Further, the client 303 may seek to establish a secure communication channel using a secure remote computer connection technique, such as Windows Remote Desktop, Citrix, Virtual Network Computing (VNC) or other "screen-scraping" technology.

It also should be noted that the resource server 317 shown in FIG. 3 is merely representative of any combination of one or more servers that can provide a requested resource 307. Thus, the resource server 317 may be any server or combination of servers responsible for providing one or more resources 323 to clients 303. For example, the resource server 317 may be a Domain Name Service (DNS) server, an electronic mail server, a server that maintains a database, a print server, a data storage server, a file or document management server, a Voice over Internet Protocol (VOIP) server, a remote shell or terminal service or the like. With some implementations of the invention, the resource server 317 may only be indirectly responsible for providing requested resources. For example, the resource server 317 may be a proxy server providing a connection to yet another server through, for example, a private network, which will actually provide the requested resources to the client 303. Thus, the resource 307 being sought by the client 303 through the network 301 does not have to be in physical or logical proximity to the resource server 317. It also should be appreciated that the resource server 317 may be responsible for providing a variety of different types of resources, including any combination of data files and services.

Defining Resources

The resources 307 may include Web resources, network resources, and file system resources. Web resources will typically be Web-based applications or services that are accessed using HTTP or HTTPS. For example, Web resources may include Microsoft Outlook Web Access and other Web-based e-mail programs, Web portals, corporate intranets, and standard Web servers. With various examples of the invention, traffic to these Web resources may be proxied through a Web proxy service, i.e., a secure gateway through which users can access private Web resources from the Internet. A Web resource can be defined in various ways.

Network resources are then client/server enterprise applications that run over TCP/IP, including applications that use UDP. Examples of network resource may include thin-client applications such as Citrix, full client/server applications such as Microsoft Outlook, Lotus Notes, or SAP, or terminal servers. With various examples of the invention, network resource will be defined by specifying a host name, an IP address or IP range, a subnet IP address, a WINS Domain, or a DNS domain. Network resources can also be used to define a network object containing multiple Web resources (such as a domain), or to define a network object that can be used to control access based on the source of a connection request. The following list explains the syntax used to define each of these resource types. It should be noted that host names can be fully qualified or unqualified.

URL Type Examples:
Standard URL—http://host.example.com/index.html
Standard URL with port number http://host.example.com:8445/index.html
URL for secure site—https://host.example.com/index.html
URL containing IP address—http://192.0.34.0/index.html
Resource Type Examples
Host name—bart.private.example.com
Host IP address—192.0.34.72
IP range—192.0.34.72-192.0.34.74
Subnet—192.0.34.0/255.255.255.0
Domain name—private.example.com
Windows domain—example or example.com File system resources may then include Windows network servers or computers containing shared folders and files that users can access via the resource server 317. A file system resource can be defined using, e.g., a specific file system share by a UNC path or an entire Windows domain. Defining an entire Windows domain gives authorized users access to all the network file resources within the domain. A specific file system resource can be an entire server (for example, \\ginkgo), a shared folder (for example, \\john\public), or a network folder (\\ginkgo\news). A file system resource can also reference a user's personal folder on the network. This feature allows a single shortcut to be created that the resource server 317 can dynamically reference as a personal folder for a current user.

FIGS. 4A and 4B illustrate user interfaces that may be employed with various implementations of the invention to define a resource. For example, from a navigation menu, a user may obtain access to the Add/Edit Resource interface page 401. To name the new resource, the administrator can type the name for the resource in the Name field 403. Then, in the Description field 405, the administrator can type a descriptive comment about the resource. Completing the Add/Edit Resource interface page 401 then summons the Resource Definition interface page 407. In this page, an administrator can employ the field groups 409-419 to provide the appropriate information to define the resource. For example, in the Host name field group 409 or IP field group 411, the administrator can enter a host name (it can be qualified or unqualified) or type the full IP address for the host in dotted decimal form (w.x.y.z), respectively. An IP range typically identifies a partial range of computers within a subnet. Under the IP range area, the IP addresses may be entered at the beginning of the range (From) and the end (To) of the IP range in dotted decimal form (w.x.y.z). A subnet is a portion of a network that shares a common address component. Accordingly, a subnet can be entered in the Subnet field group 413 by typing the IP address and Subnet mask in dotted decimal form (w.x.y.z). A domain encompasses one or more hosts, so a Domain can be entered into the Domain field group 415 by typing the name of the domain (such as example.com).

To define a Web resource, the administrator can select a URL for the resource and then type the appropriate URL into the URL field group 417. The administrator will typically include the http:// or https:// protocol identifier. For file share resources, the administrator will define a specific file system resource by entering a UNC path into the UNC field group 419. This can be an entire server (for example, \\ginkgo), a shared folder (for example, \\john\public), or a network folder (\\ginkgo\news). To reference a user's personal folder on the network, the administrator will activate the Network Share Button 421 and then type a UNC path containing the variable XXX_Username XXX into the UNC field group 419.

Defining a Redirection Rule

Once a resource 307 has been defined, then an administrator can define one or more redirection rules for that resource. With various examples of the invention, the redirection rules can advantageously be associated with resources definitions that already have been created for use by the policy server 309. With other examples of the invention, however, the redirection rules can be generated using resource definitions separate from those used by the policy server 309.

With various examples of the invention, the redirection rules may include both inclusion redirection rules and exclusion redirection rules. An inclusion redirection rule will instruct the client 303 to redirect a resource access request for the designated resource to the network 301. An exclusion redirection rule will then instruct the client 303 to handle a resource access request for the designated resource locally. With various examples of the invention, a redirection rule will automatically be created for each resource defined for the policy server 309. Alternately, various examples of the invention may require an administrator to specifically create an inclusion redirect rule for each desired resource. Typically, an administrator will specifically create an exclusion rule for a resource.

Figure 5:
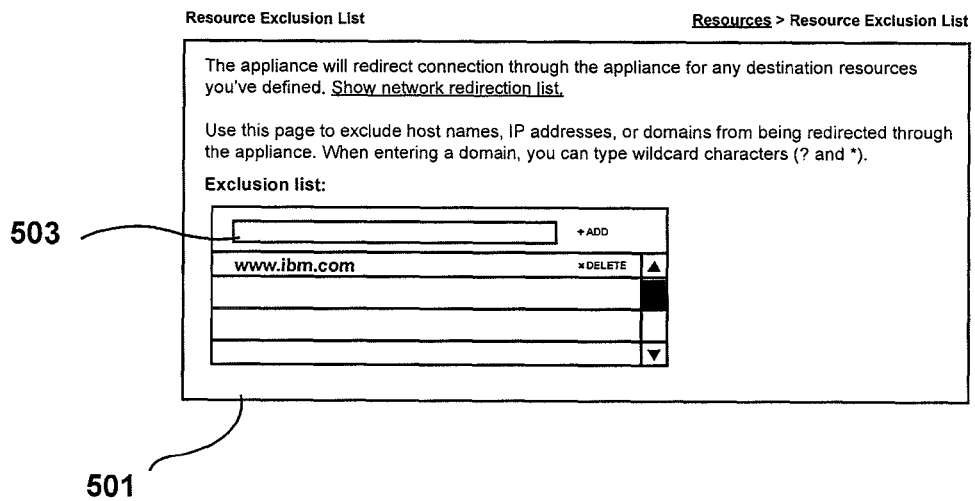
FIG. 5 illustrates a user interface that may be employed to create an exclusion rule according to various examples of the invention.

For example, FIG. 5 illustrates a user interface 501 that may be employed to create an exclusion rule. As seen in this figure, the user interface 501 includes a field 503 in which the administrator can define a resource for exclusion from redirection in a client 303. With various examples of the invention, the administrator can define the resource to be excluded using host names, domain names, or IP addresses.

Various examples of the invention also will allow "wildcard" characters to be used in defining resources for inclusion redirection rules and exclusions redirection rules. For example, some implementations of the invention may support the use of the character as a wildcard for multiple characters in a resource definition. In addition, some examples of the invention may also support the use of the '?' character as a single-character wildcard. Thus, using these wildcard characters, the hostname "j*.mycompany.com" would match each of the hostnames "j.mycompany", "jon.mycompany.com" and "jscott.mycompany.com". Similarly, the hostname "j??.mycompany.com" would match the hostname "jon.mycompany.com" but not the hostname "j.mycompany.com" or "jscott.mycompany.com", because each '?' must correspond to a single character. The use of these types of wildcard characters is beneficial where, for example, it is undesirable to use the bandwidth of the virtual private network to access resources that are otherwise publicly available. For example, the administrator may define a resource associated with a company's private network, such as myCompany.com. It would still be desirable, however, to route traffic to the company's public web servers (e.g., mycompany.com) locally from the client rather than through the network 301. With various examples of the invention, an administrator thus can avoid this undesired redirection by add an exclusion redirection rule for the resource defined as "www*.myCompany.com."

Client Use of Redirection Rules

Once the redirection rules have been created, they are then passed from the redirection rules server 315 to the client as a list. In the list, the redirection rules may be presented as a non-sorted list of strings having any desired format. For some of the examples of the invention, however, the redirection rule list may include a non-sorted list of strings having the following rule type and format:

| Hostname Rules | Rule String Format |
|---|---|
| Qualified | "HOSTNAME=morty.in.mycompany.com" |
| Unqualified | "HOSTNAME=morty" |
| Wildcard | "HOSTNAME=morty*" |
| Exclude | "EXCLUDE_HOSTNAME="morty*"" |

| Domain Rules | Rule String Format |
|---|---|
| Domain | "DOMAIN=in.mycompany.com" |
| Wildcard | "DOMAIN=*.in.mycompany.com" |
| Exclude | "EXCLUDE_DOMAIN="in.mycompany.com" |

| IP Address Rules | Rule String Format |
|---|---|
| Address | "HOSTNAME=192.168.1.1" |
| Exclude | "EXCLUDE_HOSTNAME=192.168.1.1" |

| IP Subnet Rules | Rule String Format |
|---|---|
| Subnet | "SUBNET=192.168.0.0, 255.255.0.0" |
| Exclude | "EXCLUDE_SUBNET=192.168.0.0, 255.255.255.0" |

| IP Address Range Rules | Rule String Format |
|---|---|
| Domain | "RANGE=192.168.1.0, 192.168.1.100" |
| Exclude | "EXCLUDE_RANGE=192.168.1.0, 192.168.1.100" |

Figure 6:
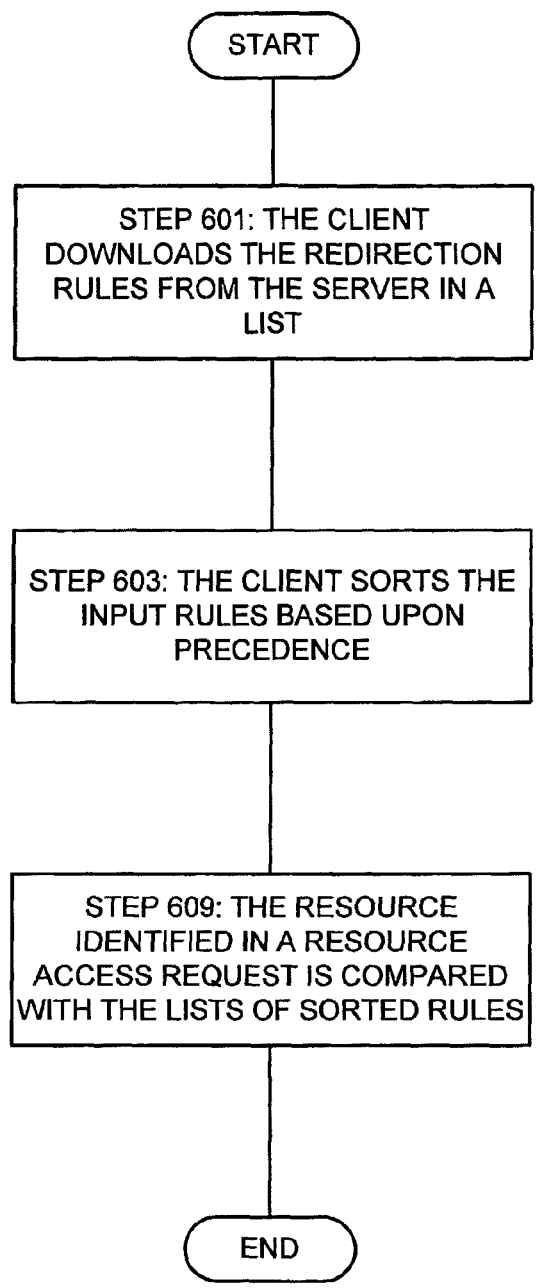
FIG. 6 illustrates a flowchart showing the use of the redirection rules according to various examples of the invention.

The use of the redirection rules will be described in more detail with reference to the flowchart illustrated in FIG. 6.

Figure 7:
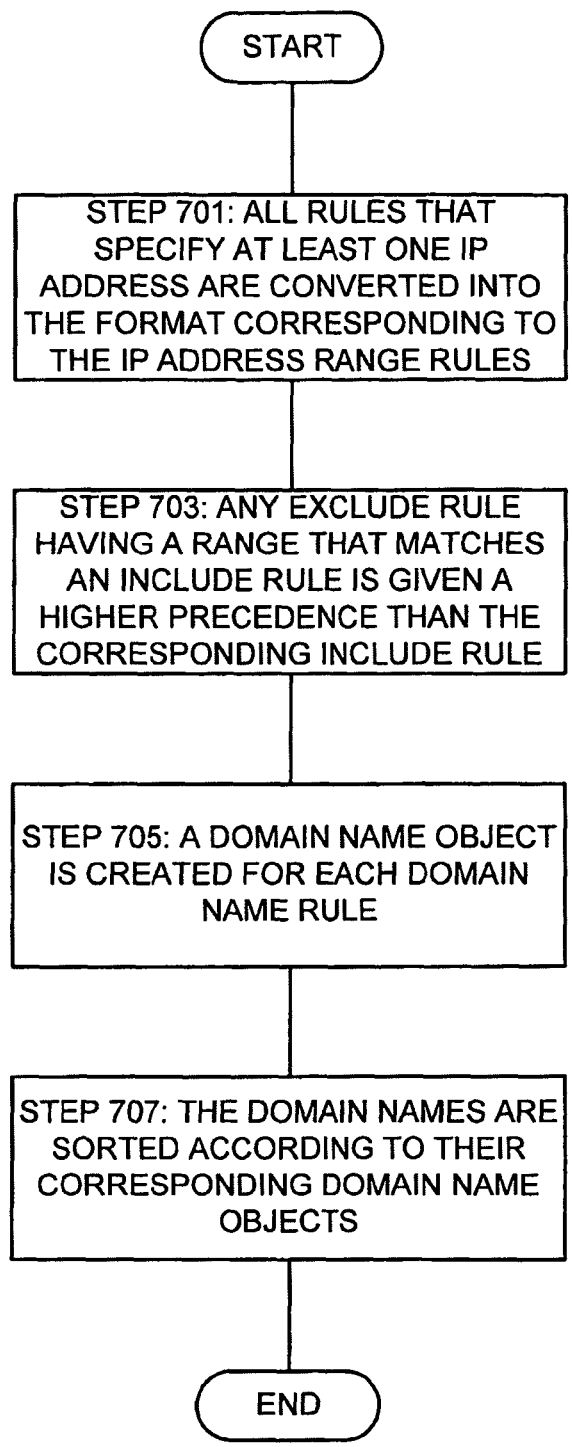
FIG. 7 illustrates a flowchart showing a sorting procedure that may be employed to sort redirection rules according to various examples of the invention.

Initially, in step 601 the client downloads the redirection rules from the server in a list. Next, in step 603, the client sorts the input rules based upon precedence. With various embodiments of the invention, the order of precedence is arranged from most specific identification information to the least specific identification information. One example of a sorting procedure that may be employed by various embodiments of the invention is illustrated in more detail in FIG. 7.

Figure 8:
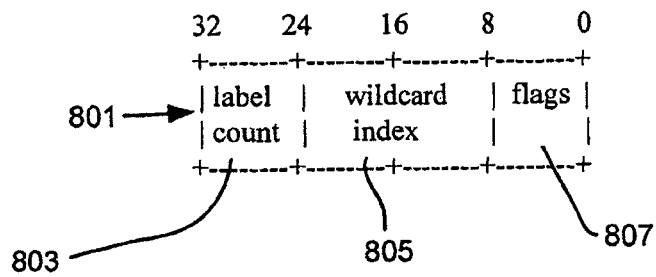
FIG. 8 illustrates a domain name object that may be employed according to various examples of the invention.

As seen in this figure, in step 701 all redirection rules that specify at least one IP address are converted into the format corresponding to the IP address range rules. Thus, the IP address rules remain unchanged, as these rules specify a range of one IP address. The IP subnet rules, however, are transformed into an IP address range that includes all of the addresses in the subnet. The list of rules that specify at least one IP address are then sorted based upon, e.g., range size from smallest to largest. Next, in step 703, any exclude rule having a range that matches an include rule is given a higher precedence than the corresponding include rule. Next, the rules that include at least one domain name are sorted. More particularly, in step 705, a domain name object 801 is created for each domain name rule. As illustrated in FIG. 8, the domain name object 801 may have a label count field 803, a wildcard index field 805, and one or more flag fields 807. In the illustrated example, the label count field 803 includes 8 bits, the wildcard index field 805 includes 16 bits, and the flag fields 807 employ 8 bits.

The labeled count field 803 records the number of labels in the domain name for the domain name rule. For example, the name "mycompany.com" would have two labels, while the name "corporate.avantail.com" would have three labels. In the wildcard index field 805, a bit is set for each label without wild cards, with the highest order bit corresponding to the right-most label. For example, a redirection rule with the resource name "in.mycompany.com" would have an index of 7 (binary 111). A redirection rule with the resource name "?n.mycompany.com", on the other hand, would have an index of 6 (binary 110). The domain name *.av*.com would then have an index of 4 (binary 100), while a redirection rule with the resource name "in.mycompany.*" would have an index of 3 (binary 011). The flag fields then include a flag indicating when the domain name has no partial match (i.e., the name begins with "."), and a flag indicating whether the domain name was used in an exclude rule or an include rule, such that the exclude rule takes precedence over the include rule.

Accordingly, in step 707, the domain names are sorted according to their corresponding domain name objects. Thus, a first domain name having a higher label count than a second domain name would take precedence over the second domain name. If two domain names have the same label count, then the domain name with the higher wild card index will take precedence. If the label count, wildcard index, and flag values match for two or more domain names, then the domain names are sorted alpha-numerically. In this manner, each rule is assigned an order of precedence in which it will be implemented by a client 303.

Returning now to FIG. 6, the sorted rules or output for use by the client in step 605. With various examples of the invention, the sorted rules may be output as three separate lists: the list of IP address rules, sorted according to their IP address ranges, a list of host name rules sorted as described in detail above, and a third list of domain rules, which also have been sorted according to the process discussed in detail above. During its operation, a client 303 will employ the rules to determine which resource access messages are routed through the virtual private network, and which ones are handled locally. More particularly, in step 609, the resource identified in a resource access request is compared with the lists of sorted rules, to determine if the resource identifier referenced in the resource access message matches a resource rule. For example, if the resource access request includes an IP address to identify a resource, then that IP address is sequentially compared with the IP addresses referenced in the IP address rules. Similarly, if a resource access request includes a domain name or a host name to identify a resource, then that request is sequentially compared to the corresponding host name rule list or domain rule list, respectively. It should be noted that, if the resource access request includes both a domain name and a host name to identify a resource, then the host name should be compared with the host name rules list before the domain name is compared with the domain name rules list. For either a domain name resource identifier or a host name resource identifier, each element of the corresponding rule list is traversed from most specific (front) to least specific (end).

If the resource identifier is matched with a resource reference in an include rule, then the comparison process returns a successful match. If the resource identifier matches an exclude rule, then the comparison process stops traversing the list, and returns an unsuccessful match to the client. If the comparison process fully traverses the list without matching the resource identifier to a rule, then an unsuccessful match also is returned.

Example Client

Figure 9:
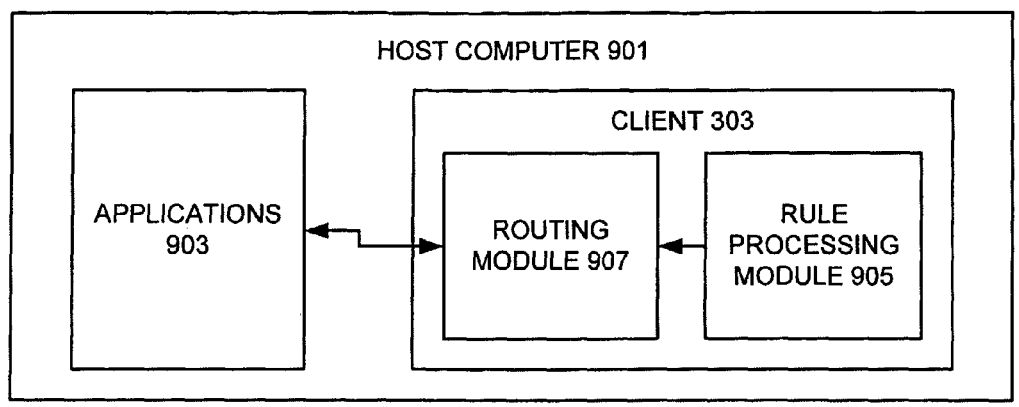
FIG. 9 illustrates a client that may be employed according to various examples of the invention.

FIG. 9 schematically illustrates a client 303 that may be employed by various examples of the invention. As seen in this figure, the client 303 is hosted on a computer 901, such as the computing device 201 described in detail above. In addition to hosting the client 303, the computer 901 may also host a number of applications 903 that will generate resource access requests. The client 303 then includes a rule processing module 905 and a routing module 907. The rule processing module 905 obtains the redirection rules from the redirection rule server 315, and orders the rules as described in detail above. The routing module 907 then applies the redirection rules to routing the resource access requests from the applications 903.

Local Forward Web Server Client

Figure 10:
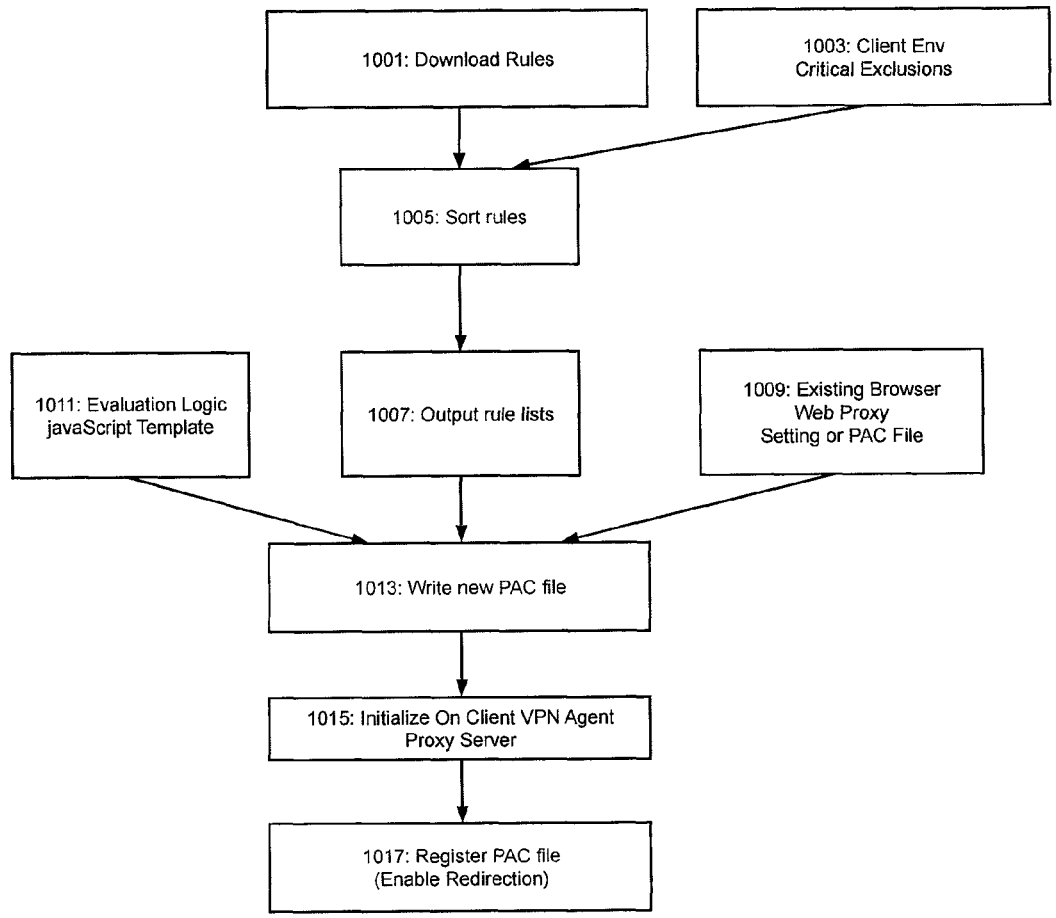
FIG. 10 illustrates a flowchart showing a process that a client, employing a local forward Web server to establish a virtual private network between a computer and a network, may prepare redirection rules for implementation according to various examples of the invention.

FIG. 10 illustrates a process that a client 303A, employing an local forward Web server to establish a virtual private network between the computer 901 and the network 301, may use to prepare redirection rules for implementation according to various examples of the invention. As will be appreciated by those of ordinary skill in the art, this type of client employs some type of additional software, such as JavaScript or ActiveX programs, to employ a browser application (such as Microsoft Internet Explorer) as a proxy server to establish a secure connection with the network 301.

Initially, in step 1001, the client 303A will download the redirection rules from the redirection rules server 315. Next, in step 1003, the rule processing module 905 will identify one or more client environmental critical exclusions for use in sorting the downloaded rules. These environmental critical exclusions may include, for example, addresses that are employed locally on the client 303A for specific purposes, such as an address for a network gateway used by the computer hosting the client 303A. As will be appreciated by those of ordinary skill in the art, these exclusions will address information employed by the local host of the client 303A for which the client 303A should have no involvement.

Next, in step 1005, the rule processing module 905 sorts the list of rules downloaded from the redirection rule server 315, and outputs the sorted rule list in step 1007. In step 1009, the routing module 907 obtains an existing browser Web proxy setting or proxy auto configuration (PAC) file that is used to configure the browser as a proxy server. As known by those of ordinary skill in the art, a proxy auto configuration file provides the browser with proxy configuration information from a remote JavaScript file, rather than requiring that the information be statically entered. Next, in step 1011, the rule processing module 905 obtains an evaluation logic JavaScript template. This JavaScript template provides the logic that the PAC file will use to evaluate a resource access request based upon the redirection rules. Then, in step 1013, the rule processing module 905 employs the evaluation logic JavaScript template merged with rules from 1007, 1009 and 1011 respectively, to create a new browser web proxy setting or PAC file. Next, in step 1015, the rule processing module 905 initializes the local forward proxy server. Then, in step 1017, the rule processing module 905 registers the PAC file with the browser, in order to enable redirection of VPN resource access requests to the local web proxy server client according to the programming logic included in the new PAC file.

Figure 11:
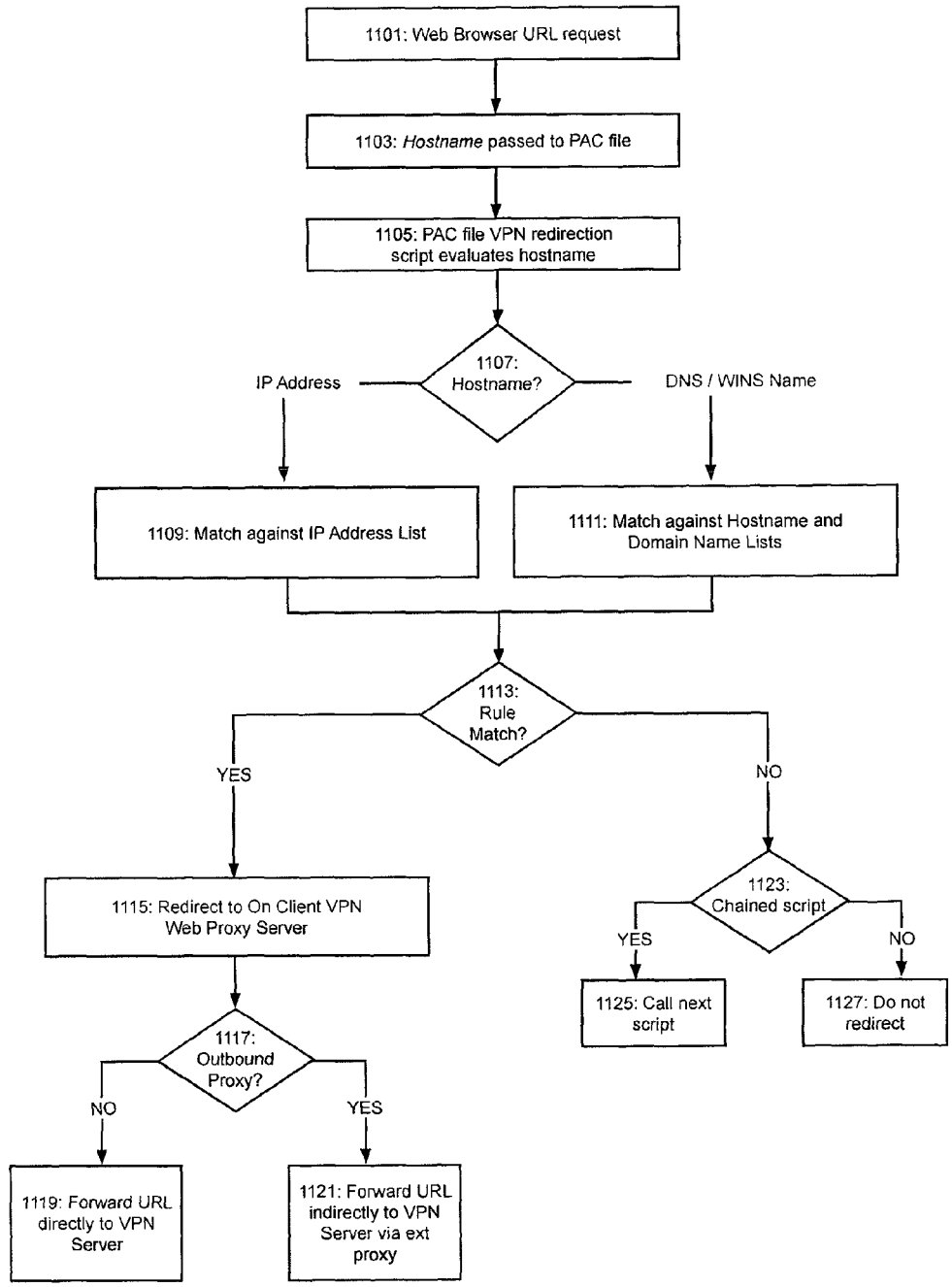
FIG. 11 illustrates a flowchart showing how the client, employing a local forward Web server to establish a virtual private network between the computer and the network, uses the redirection rules to process requests for access to a resource.

FIG. 11 illustrates how the client 303A, employing a local forward Web server to establish a virtual private network between the computer 901 and the network 301, uses the redirection rules to process requests for access to a VPN resource. Initially, in step 1101, the Web browser receives a request to access a resource from, e.g., an application 903 or user. The resource access request may be, for example, in form of a URL entered into the address field of the browser. Next, in step 1103, the routing module 907 provides the resource identifier used in the resource access request to the PAC file. Then, in step 1105, the PAC file executes its JavaScript program to evaluate the resource identifier. Specifically, in step 1107, the JavaScript program determines whether the resource identifier is a specific IP address, or a name, such as a host name or domain name. If the resource identifier includes an IP address, then, in step 1109, the JavaScript program compares the IP address with the IP address rule list, to determine if the IP address matches a resource identified in the IP address rules list. If, however, the resource identifier is a name, then, in step 1111, the JavaScript program matches the name against the host name rule list, the domain name rule list, or both, as described in detail above.

Next, in step 1113, the JavaScript program determines whether or not the resource identifier matched a resource specified in a redirection rule. If it did, then in step 1115, the routing module redirects the request for resources to a local web proxy server associated with the virtual private network. More particularly, in step 1117, local web proxy server determines whether the client 303A is employing an external proxy server. If the client is not using an external proxy server, then in step 1119, the local web proxy server forwards the resource access request directly to the VPN server in the network 301 in step 1119. If, however, the client 303 is using an external proxy server, then in step 1121 the local web proxy server forwards the URL indirectly to the VPN server in the network 301 via the external proxy.

If the JavaScript program determines that the resource identifier has not matched a rule, then in step 1123 it determines whether or not the PAC file is part of a chained script in step 1123. More particularly, the browser may be employing one or more additional PAC files for purposes unrelated to implementing the client 303A. Accordingly, if the PAC file used to enforce the redirection rules is part of a chain of scripts for operating the browser, then in step 1125 the routing module 907 calls the next script for execution by the browser. If, however, the client's PAC file is not part of a chained script, then the routing module 907 makes the determination not to redirect the resource request message in step 1127.

Local Circuit Proxy Client

With some examples of the invention, a client 303B may use a local circuit proxy to establish a virtual private network connection between the computer 901 and the network 301. With this type of local circuit proxy client 303B, the client 303B may forward a resource access request to the network 301 only if the request includes a virtual or "spoofed" IP address. Accordingly, the client 303B will map a spoofed IP address to the actual address for the resource, and provide the spoofed IP address to the applications 903 for use.

Figure 12:
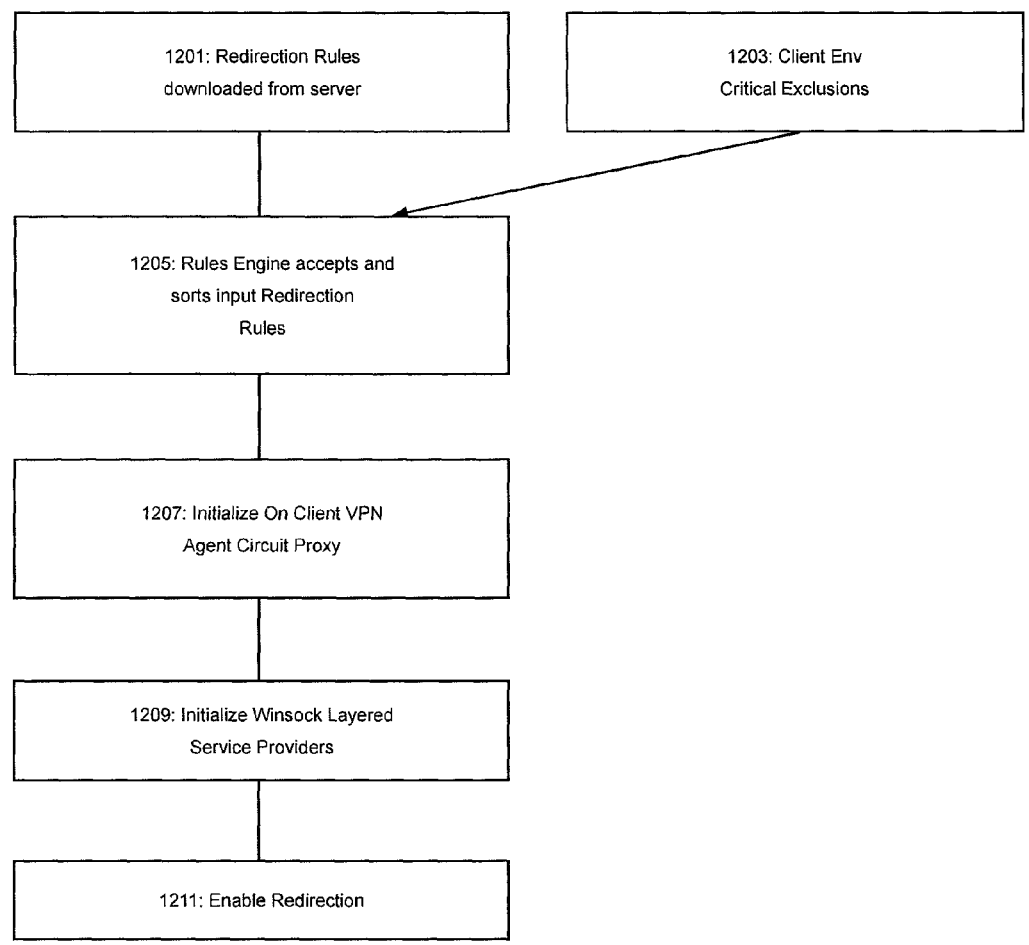
FIG. 12 illustrates a flowchart showing a process that a client, employing an local circuit proxy to establish a virtual private network between a computer and a network, may use to prepare redirection rules for implementation according to various examples of the invention.

FIG. 12 illustrates a flowchart showing how a process that a client 303B, employing a local circuit proxy to establish a virtual private network between the computer 901 and the network 301, may use to prepare redirection rules for implementation according to various examples of the invention. Initially, in step 1201, the rule processing module 905 downloads the redirection rules from the redirection rule server 315. Next, in step 1203, the rule processing module 905 obtains client environmental critical exclusions, which are used to determine exclusions for when the rules will be employed, as discussed in detail above. Next, in step 1205, the rule processing module 905 accepts the redirection rules, and sorts them in step 1205 as also described in detail above. In step 1207, the rule processing module 905 initializes the VPN agent circuit proxy employed by this type of virtual private network access method. Then, in step 1209, the rule processing module 905 initializes the WinSock Layered Service Provider. The WinSock Layered Service Provider is a conventionally known interface tool provided by the WinSock architecture in Microsoft Windows operating system software available from Microsoft Corporation of Redmond, Wash., and thus will not be discussed here in further detail. Lastly, in step 1211, the rule processing module 905 enables the local circuit proxy for VPN resource redirection.

Figure 13:
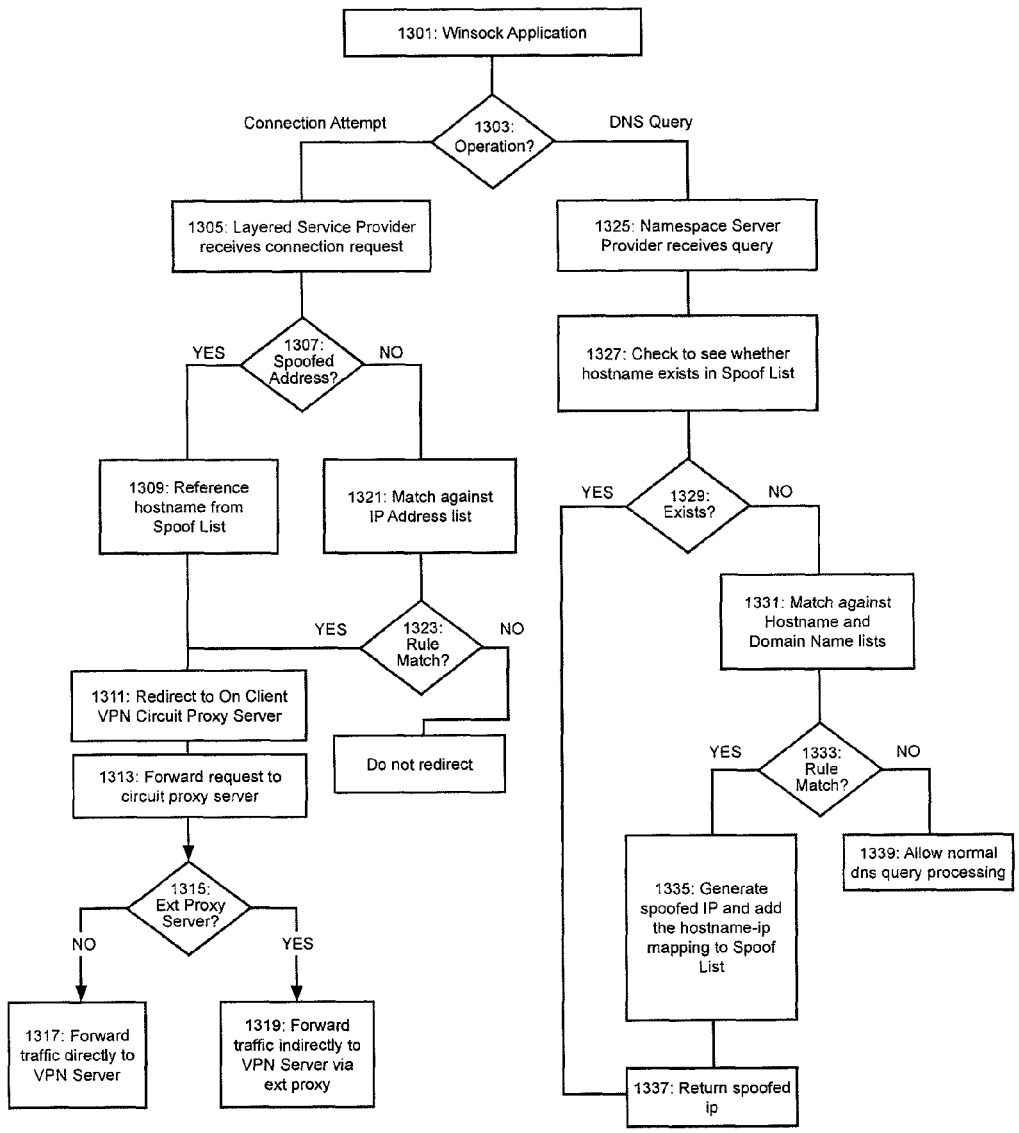
FIG. 13 illustrates a flowchart showing how the client, employing a local circuit proxy to establish a virtual private network between the computer and the network, may use the redirection rules to redirect resource access request from applications.

FIG. 13 then illustrates a flowchart showing how the client 303B, employing a local circuit proxy to establish a virtual private network between the computer 901 and the network 301, may use the redirection rules to redirect resource access request from applications 903. First, in step 1301, a WinSock application is initiated. Next, in step 1303, the routing module 907 identifies an operation requested by an application 903 through the WinSock application in step 1303. If the operation is an attempt to connect to the identified resource, then the Layered Service Provider receives the connection request in step 1305. Then, in step 1307, the Layered Service Provider determines whether or not the resource access request includes a spoofed VPN IP address. If it does, then in step 1309 the Layered Service Provider references the host name from the spoof list in step 1309. Subsequently, in step 1311, the routing module redirects the resource access request to the on-client VPN circuit proxy server in step 1311. In step 1313, the local circuit proxy client forwards the request for resources to a 301 circuit proxy server associated with the virtual private network. More particularly, in step 1315, the local circuit proxy client determines whether the client 303B is employing an external proxy server. If the client is not using an external proxy server, then in step 1317, the local circuit proxy client forwards the resource access request directly to the VPN server in the network 301 in step 1119. If, however, the client 303 is using an external proxy server, then in step 1319 the local circuit proxy client forwards the URL indirectly to the VPN server in the network 301 via the external proxy.

Returning to step 1307, if the resource access request does not contain a VPN spoof IP address, then, in step 1321, the routing module 907 matches the resource identifier referenced in the resource access request against the IP address rules list. If the routing module 907 determines that there is a rule match in step 1323, then the Layered Service Provider returns to step 1311 to redirect the resource access request to the on-client VPN circuit proxy server. If, however, the resource identifier does not match an IP address rule, then the resource access request is not redirected to the VPN in step 1323.

Returning to step 1303, if the routing module 907 determines that the resource access request is a domain name server (DNS) query or a WINS name server query, then, in step 1325, the routing module 907 provides the resource access request to the Winsock Namespace Service Provider in step 1325. Like with Winsock Layered Service Provider, the WinSock Namespace Service Provider is a conventionally known interface tool provided by the WinSock architecture in the Microsoft Windows operating system software available from Microsoft Corporation of Redmond, Wash., and thus will not be discussed here in further detail. Next, the Namespace Service Provider determines in step 1327 whether the resource identifier exists in a spoof list. Next, in step 1329, if the Namespace Service Provider determines that the resource identifier does not exist in the spoof list in step 1329, then in step 1331 the Namespace Service Provider compares the resource identifier to the host name and domain name rule lists as discussed in detail above. In step 1333, the Namespace Service Provider determines if the resource identifier has matched a rule. If it has, then in step 1335, the Namespace Service Provider generates a spoofed VPN IP address and adds the host name IP mapping to the spoof list. Then, in step 1337, it returns the spoofed VPN IP address. If, however, the Namespace Service Provider determines that the resource identifier has not matched a rule in step 1333, then, in step 1339 it allows normal DNS or WINS query processing by the client 303B. Returning to step 1329, if the Namespace Service Provider initially determines that the resource identifier already exists in the spoofed list, then it proceeds immediately to step 1337 and returns the spoofed VPN IP address.

Local IP Tunnel Adapter Client

Figure 14:
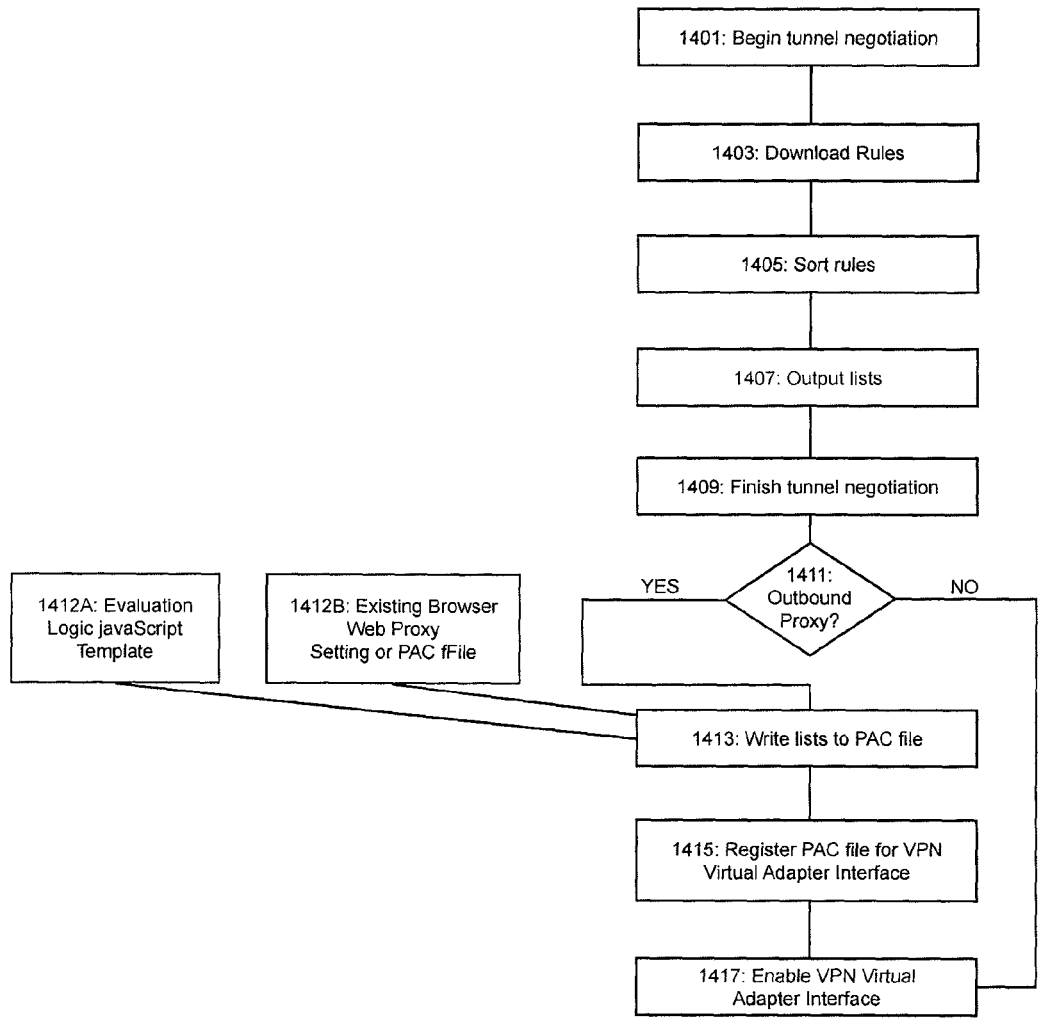
FIG. 14 illustrates the illustrates a flowchart showing how a process that a client, employing a local IP tunnel adaptor client to establish a virtual private network between a computer and a network, may use to prepare redirection rules for implementation according to various examples of the invention.

FIG. 14 illustrates the illustrates a flowchart showing how a process that a client 303C, employing a local IP tunnel adaptor client to establish a virtual private network between the computer 901 and the network 301, may use to prepare redirection rules for implementation according to various examples of the invention. This type of client can securely connect to the network 301, such that the client can not only send outbound communications to the network 301, but can additionally receive inbound communications that were not initiated by the client 303C.

As shown in FIG. 14, in step 1401 the client 303C began the tunnel negotiations to establish a secure connection between the client 303C and the network 301 (i.e. tunnel server in the network 301). Next, in step 1403, the rule processing module 905 downloads the redirection rules from the redirection rule server 315, and in step 1405 sorts the rules as described in detail above. After sorting the rules, the rule processing module 905 outputs the sorted rule list in step 1407. Tunnel negotiation is finished at step 1409. Next, step 1411, the rule processing module 905 determines whether the client 303C is using an outbound proxy. If the client 303C is using an outbound proxy, then, in step 1413, the rule processing module 905 writes the rule address list to a Proxy Auto Configuration (PAC) file. The rule processing module 905 obtains an existing browser web proxy setting or proxy auto configuration (PAC) file in step 1412A, and obtains an evaluation logic JavaScript template in step 1412B. As a result, the rule address list is written to a PAC file in step 1413. In step 1415, the rule processing module 905 then registers the PAC file with the browser for transiting of tunnel traffic between the local tunnel adapter and the 301 tunnel server. Then, in step 1417, the rule processing module 905 enables the local tunnel adapter interface. Turning now to step 1411, if the client 303C is not using a web proxy for outbound communications, then the processing module 905 immediately enables the interface in step 1417.

Figure 15:
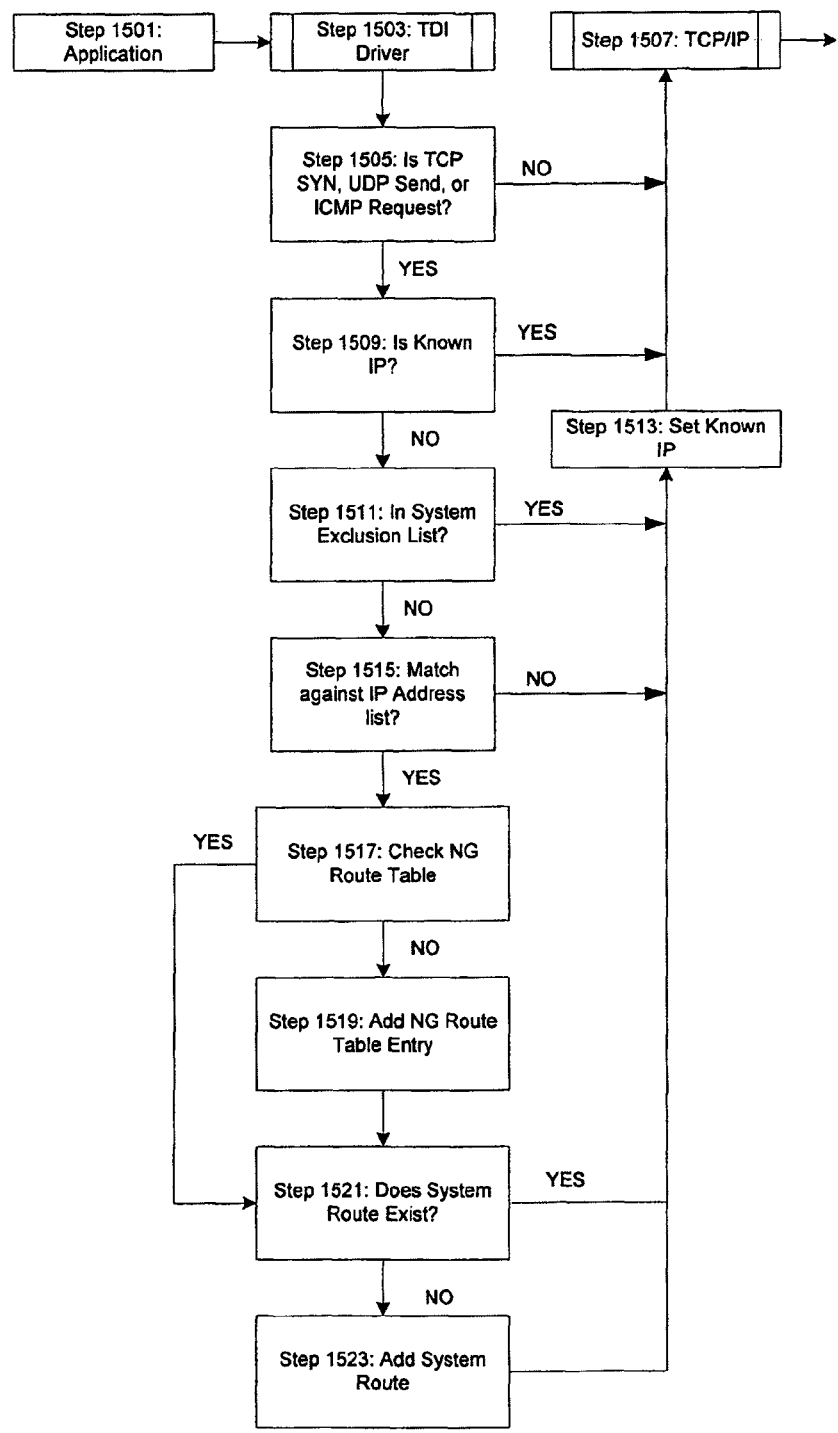
FIG. 15 illustrates the process by which the client will route outbound traffic.

FIG. 15 illustrates the process by which the client 303C will route outbound traffic. Additionally, in step 1501, an application 903 running on the client computer 901 issues some type of resource access request. This request is intercepted by the transport device interface (TDI) driver in step 1503. In step 1505, the TDI driver determines whether the resource access request was a TCP SYN message, a UDP send message, or an ICMP request message. If the resource access request did not include any of these message types, then, in step 1507, the computing device 901 allows a direct TCP/IP transmission of the message. If, however, the resource access request was a TCP connect message, a UDP send message or an ICMP request message, then, in step 1509, the client 303C determines whether the IP address in the resource access request is a known IP address. More particularly, the client 303C examines the IP address, to determine whether or not it has already processed the IP address. This step is optional, and is intended to optimize the operation of the client 303C by avoiding unnecessary further analysis of the IP address if those analyses have already been made.

Next, in step 1511, the routing module 907 determines if the IP address referenced in the request access request has been included in a system exclusion list. A system exclusion list may be used to identify those IP addresses that are being used for an essential purpose by the computing device 901, and thus avoided by the client 303C. For example, the IP address of a gateway being used by the computing device 901 should note be handled by the client 303C.

If the IP address referenced in the resource access request is in the system exclusion list, then, in 1513, the routing module 907 sets the IP address as a "known" IP address. Thus, the next time the IP address is used in a resource access request it will be identified by the routing module 907 in step 1509. If, however, the IP address referenced in the resource access request is not included in the system exclusion list, then in step 1515 the routing module attempts to match the IP address referenced in the resource access request with a corresponding IP address redirection rule. If the routing module 907 cannot match the reference IP address against a corresponding IP address redirection rule, then again the IP address is identified as a "known" IP address in step 1513.

If, however, the routing module 907 does match the referenced IP address with a corresponding IP address redirection rule, then, in step 1517, the routing module 907 checks the VPN look aside table to determine if a corresponding route has been saved in the table for this address. The process by which the VPN look aside table is created and maintained will be discussed in further detail below, with respect to the method in which the client 303C handles inbound communication. If an entry for the referenced IP address does not exist in the route table entry, then the routing module 907 adds an entry for the referenced IP address to VPN look aside table in step 519. Once the entry has been made (or, if the routing module 907 determines that an entry already existed in step 1517), in step 1521 the routing module 907 determines whether a corresponding route exists in the system routing table. As will be appreciated by those of ordinary skill in the art, the system routing table is the routing table used by the operating system of the computer 901 to assign a TCP/IP communication route in step 1507. If an entry for the referenced IP address does already exist in the existing routing table, then the IP address is identified as a "known" IP address is step 1513. Otherwise, a route for the referenced IP address is added from the NG route table to the system route table in step 1523. Again, after the entry for the IP address has been made in the system route table, then in step 1513 the routing module designates the referenced IP address as a "known" IP address is step 1513.

Figure 16:
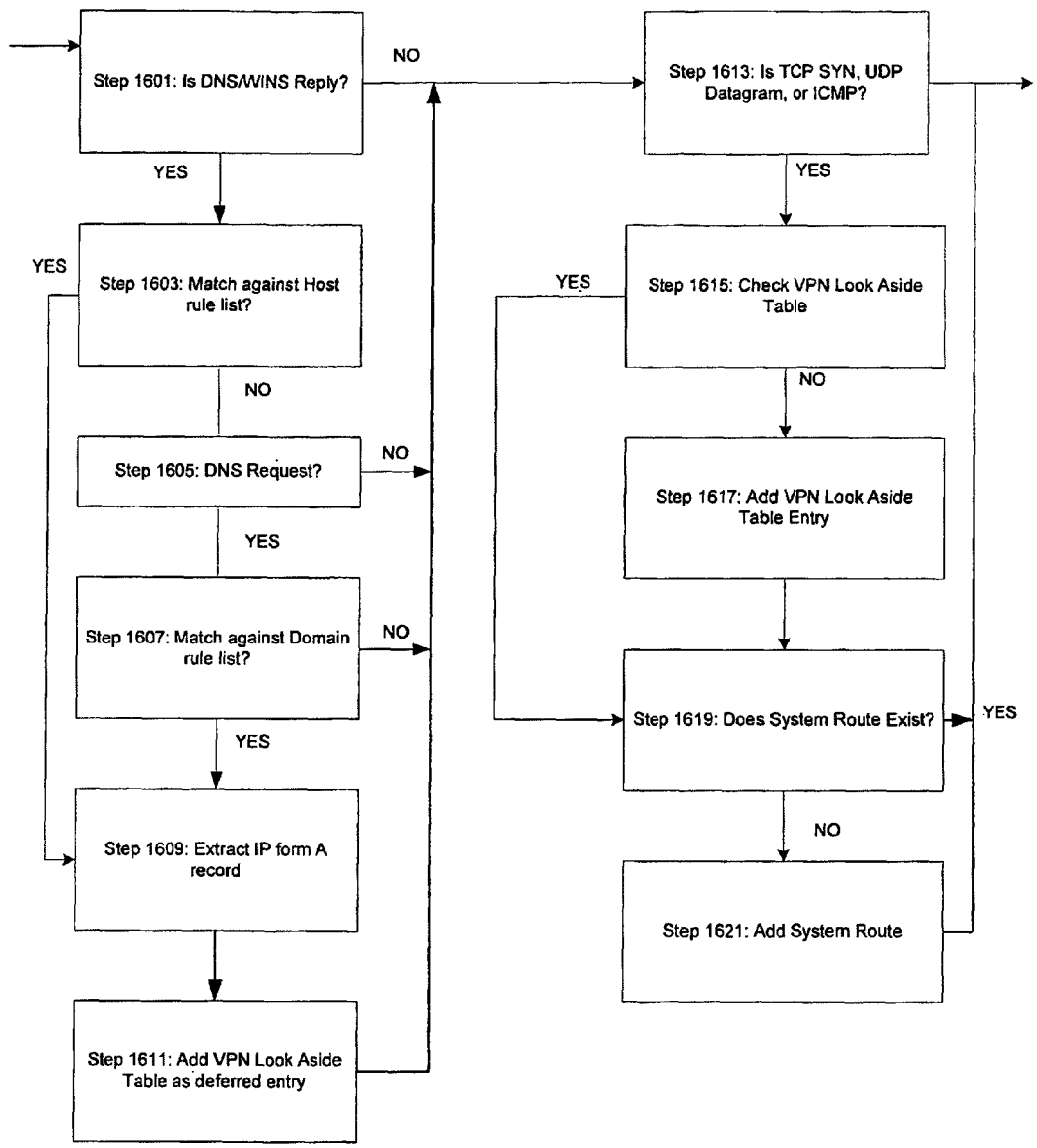
FIG. 16 illustrates how the local IP tunnel adaptor client processes incoming traffic from the network.

FIG. 16 illustrates how the local IP tunnel adaptor client processes incoming traffic from the network 301. As seen in this figure, in step 1601, the routing module 907 initially determines whether or not eh incoming message is a reply to a DNS or a WINS request. If it is a reply to a previously sent DNS or WINS request then in step 1603 the routing module 907 attempts to match the name referenced in the incoming message against a corresponding redirection rule in the host name redirection rule list. If the processing module 907 cannot match a name in the DNS/WNS reply message to a host redirection rule in the host redirection rule list, then in step 1605 the routing module 907 determines whether the reply is a reply to a DNS request. If it is, then the routing module 907 attempts to match a domain name reference in the incoming message against a corresponding domain name redirection rule in the domain name redirection rule list.

If the routing module 907 is able to match the name referenced in the incoming message in either steps 1603 or 1607 then, in step 1609, the routing module 907 extracts the IP address for the referenced host or domain name from the address record contained in the DNS/WINS reply message. Then, in step 1611, the routing module 907 adds the extracted IP address as the entry to the VPN look aside table corresponding to the reference name. In this manner, the routing module 907 creates a VPN look aside routing table based upon replies to WINS/DNS requests submitted to the network 301.

Once this process has been completed, or if the incoming message was not a reply to a DNS or a WINS request, in step 1613 the routing module 907 determines whether the resource referenced in the incoming message is a TCP SYN value, a UDP datagram, or an ICMP value. If it is not any of these value types, then the computer 901 handles the incoming message in a regular manner. Otherwise, in step 1515, the routing module 907 checks the VPN look aside table to determine if the address referenced in the incoming message has a corresponding entry. If it does not, then a routing entry for the IP address is created in the NG routing table in step 1617. Once a corresponding routing entry exists in the VPN look aside table, the routing module 907 determines whether a route for the IP address referenced in the incoming message has a corresponding entry in the system routing table. If it does not, then an entry for the IP address is made in the system routing table in step 1621.

Network-Based Implementation of a Reverse Web Proxy Client

Figure 17:
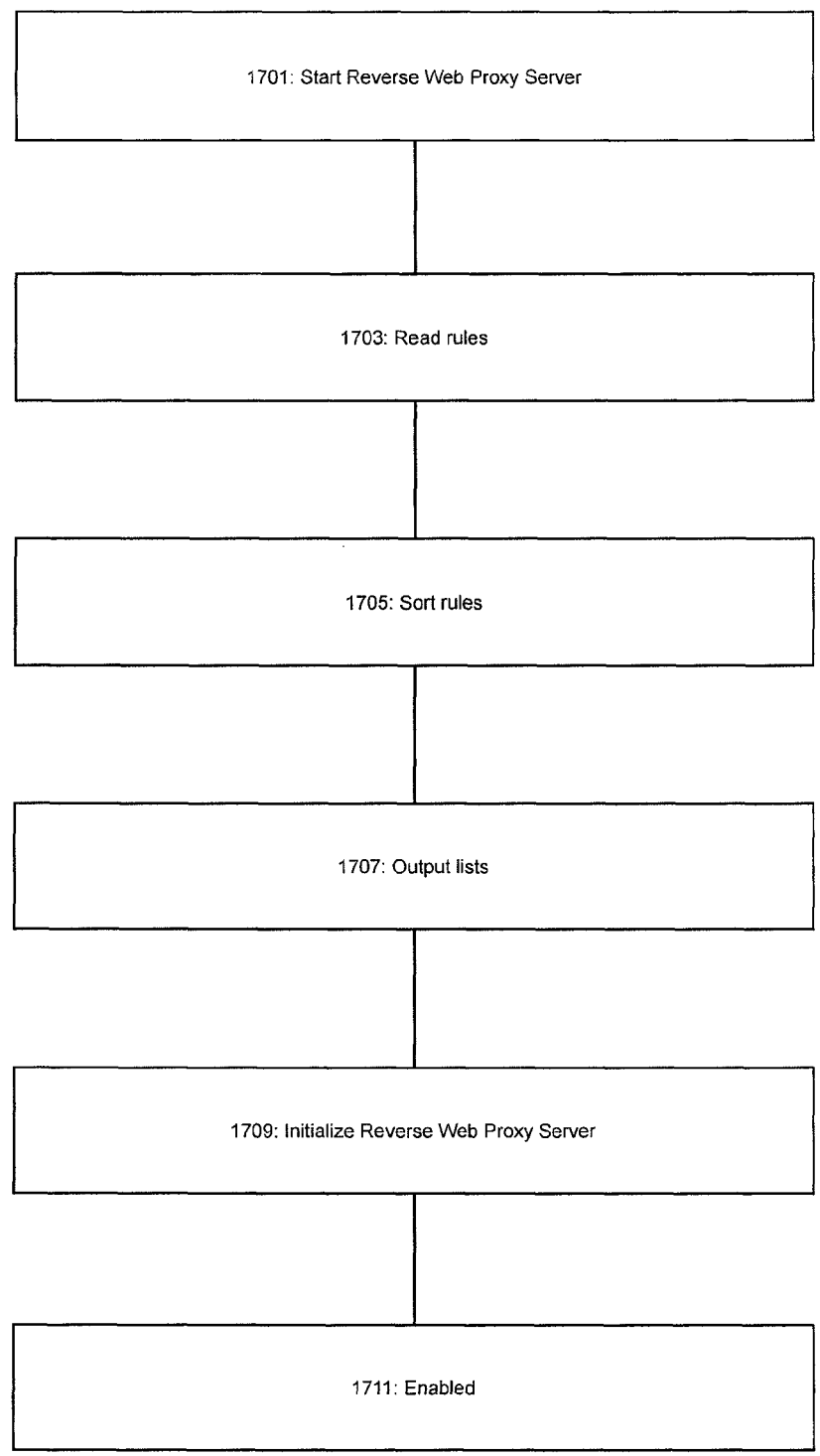
FIG. 17 illustrates a flowchart showing the operation of a network based implementation of a reverse web proxy client to prepare redirection rules of implementation according to various embodiments of the invention.

FIG. 17 illustrates the operation of a network based implementation of a network reverse web proxy server to prepare redirection rules of implementation according to various embodiments of the invention. As will be appreciated by those of ordinary skill in the art, this type of reverse web proxy client creates a "thin" client on the computer 901. All of the functions related to the client 303D; other than the dealing of the processing result, take place in the network 301.

Additionally, in step 1701, the client 303D begins the proxy service. Next, in step 1703, the rule processing module 905 reads the rules from the redirection rule server 315. It then sorts the rules as described in detail above in step 1705, and outputs the rules in step 1707. In step 1709 the client 303D the 301 network reverse proxy server, and in step 1711, the process is enabled.

Figure 18:
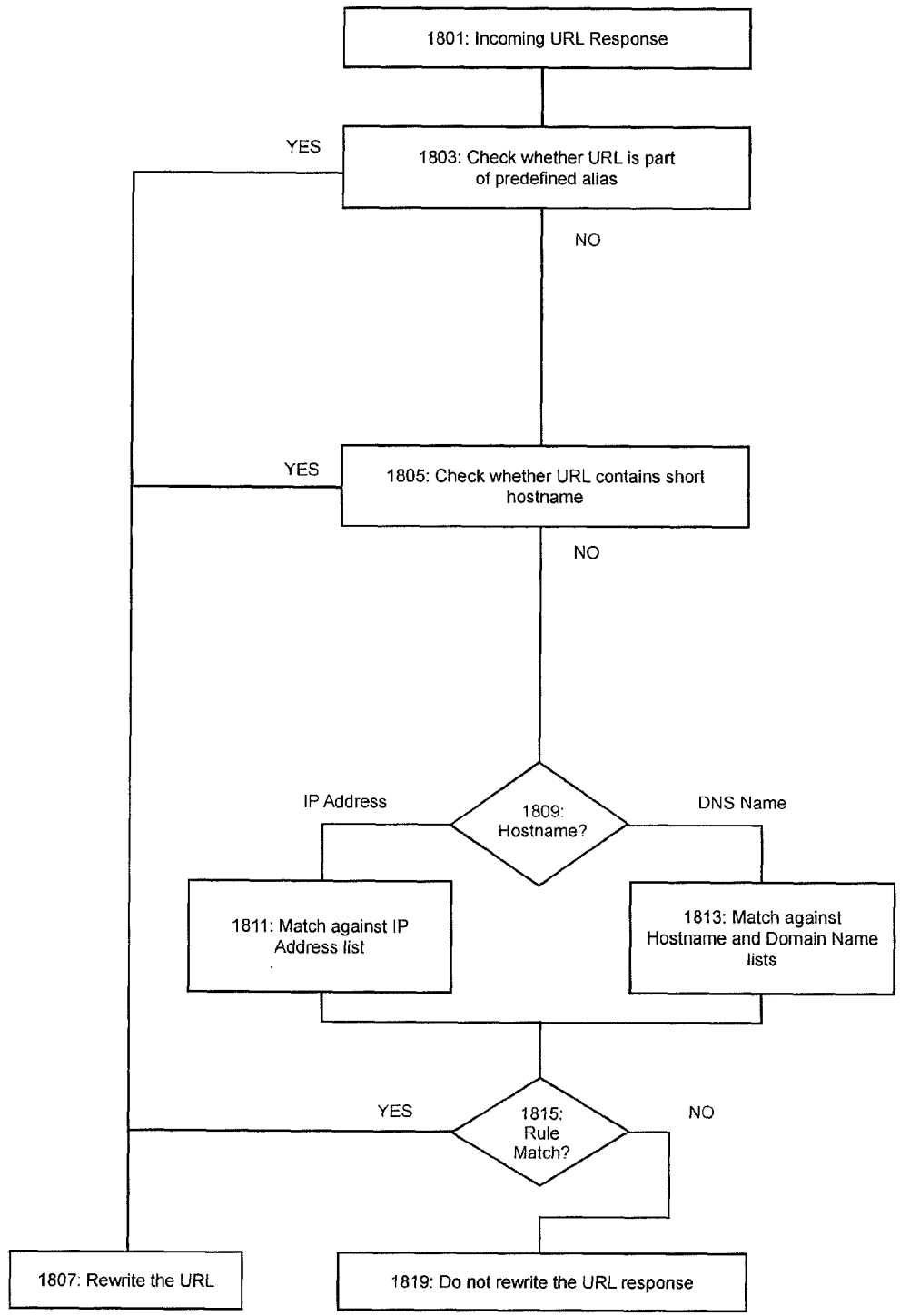
FIG. 18 illustrates a flowchart showing how the network based implementation of a reverse web proxy client employs the redirection rules according to various examples of the invention.

FIG. 18 then illustrates a method whereby a routing module 907, running in the network 301, employs the redirection rules according to various examples of the invention. As seen in this figure, in step 1801, the routing module 907 receives an incoming URL response from a resource server 315. Next, in step 1803, the routing module 907 checks to determine whether the incoming URL is part of a alias attribute associated with the resource 307. Next, in step 1805, the routing module 907 checks to determine whether the URL contains a short host name attribute associated with the resource 307. If an alias or short name matched, then in step 1807 the routing module 907 rewrites the URL relative to 301 server. Otherwise, in step 1809, the routing module determines whether the URL contains a host name. If it does not contain a name, then the IP address referenced in the URL is matched against the IP address redirection rule list in step 1811. Otherwise, the name in the URL is matched against any corresponding name in the host name redirection rule list and the domain name redirection rule list in step 1813. In step 1815, the routing module 907 determines whether or not the resource identifier referenced in the URL (either the IP address or name) was matched to a rule in one of the redirection rule lists. If it was, then the routing module 907 rewrites the URL in step 1807. Otherwise, in step 1819, the routing module 907 allows the response to complete without a URL rewrite.

Conclusion

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while particular software services and processes have been described as performing various functions, it should be appreciated that the functionality of one or more of these services and processes may be combined into a single service or process, or divided among additional services and processes.

What is claimed is:

1. A method of routing resource access requests based upon a resource name, the method comprising:
   receiving a resource access request over virtual private network, the resource access request identifying a requested resource by name;
   receiving a name service reply for the resource; wherein the name service reply is a WINS, Windows Internet Network Service, reply;
   extracting a name for the resource from the name service reply;
   determining that the resource name matches a redirection rule, the redirection rule used to determine whether the resource access request is redirected through the virtual private network or handled locally, and wherein the resource name identifies a service accessible through the virtual private network;
   deriving routing information for the resource from the name service reply when the resource name matches a redirection rule; and
   mapping the resource name against the derived routing information in a look aside table.

2. The method of claim 1, further comprising:
   determining that the name of the requested resource is in the look aside table;

obtaining the routing information mapped to the name of the requested resource from the look aside table when the name of the requested resource is in the look aside table; and routing the resource access request using the obtained routing information.

3. The method of claim 2, further comprising routing the resource access request using the obtained routing information by providing the obtained routing information to a system routing table.

* * * * *